US010321353B2

(12) United States Patent
Kim et al.

(10) Patent No.: US 10,321,353 B2
(45) Date of Patent: Jun. 11, 2019

(54) OPERATION METHODS OF COMMUNICATION NODE SUPPORTING DIRECT COMMUNICATIONS IN NETWORK

(71) Applicant: Electronics and Telecommunications Research Institute, Daejeon (KR)

(72) Inventors: Jae Heung Kim, Daejeon (KR); Ji Hyung Kim, Daejeon (KR); Mi Young Yun, Daejeon (KR); Eun Ah Kim, Daejeon (KR); Kyoung Seok Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 162 days.

(21) Appl. No.: 15/273,275

(22) Filed: Sep. 22, 2016

(65) Prior Publication Data
US 2017/0086081 A1 Mar. 23, 2017

(30) Foreign Application Priority Data

| Sep. 23, 2015 | (KR) | 10-2015-0134453 |
| Oct. 30, 2015 | (KR) | 10-2015-0152151 |
| Dec. 17, 2015 | (KR) | 10-2015-0180959 |
| Jun. 30, 2016 | (KR) | 10-2016-0082897 |
| Sep. 20, 2016 | (KR) | 10-2016-0119881 |

(51) Int. Cl.
*H04W 24/02* (2009.01)
*H04W 4/02* (2018.01)
*H04W 28/02* (2009.01)
*H04W 4/04* (2009.01)
*H04W 72/04* (2009.01)
(Continued)

(52) U.S. Cl.
CPC ....... *H04W 28/0278* (2013.01); *H04W 4/027* (2013.01); *H04W 4/046* (2013.01); *H04W 72/048* (2013.01); *H04W 76/27* (2018.02); *H04W 48/12* (2013.01)

(58) Field of Classification Search
CPC . H04W 28/0278; H04W 48/12; H04W 4/027; H04W 4/046; H04W 72/048; H04W 76/27
See application file for complete search history.

(56) References Cited

U.S. PATENT DOCUMENTS

2012/0028675 A1 2/2012 Lee et al.
2014/0119251 A1 5/2014 Park et al.
(Continued)

FOREIGN PATENT DOCUMENTS

JP 2006-261742 A 9/2006

*Primary Examiner* — Awet Haile
(74) *Attorney, Agent, or Firm* — Rabin & Berdo, P.C.

(57) ABSTRACT

Disclosed are operation methods of communication node supporting direct communications in network. The operation method comprises obtaining scheduling information configured for the direct communications from a first base station; identifying modulation and coding scheme (MCS) information and radio resource information included in the scheduling information; and transmitting, to a second UE, a first message to which a MCS indicated by the MCS information is applied through radio resources indicated by the radio resource information. Therefore, performance of a communication system can be enhanced.

11 Claims, 10 Drawing Sheets

(51) Int. Cl.
*H04W 76/27* (2018.01)
*H04W 48/12* (2009.01)

(56) References Cited

U.S. PATENT DOCUMENTS

| | | | |
|---|---|---|---|
| 2016/0073298 A1* | 3/2016 | Brahmi | H04W 36/0072 |
| | | | 455/436 |
| 2016/0212108 A1* | 7/2016 | Stojanovski | H04L 63/061 |
| 2017/0223699 A1* | 8/2017 | Yasukawa | H04W 72/0433 |
| 2017/0273128 A1* | 9/2017 | Abedini | H04J 13/0062 |
| 2017/0295601 A1* | 10/2017 | Kim | H04W 76/023 |

* cited by examiner

OPERATION METHODS OF COMMUNICATION NODE SUPPORTING DIRECT COMMUNICATIONS IN NETWORK

CROSS-REFERENCE TO RELATED APPLICATIONS

This application claims the benefit of and priorities to Korean Patent Application No. 10-2015-0134453 filed on Sep. 23, 2015, Korean Patent Application No. 10-2015-0152151 filed on Oct. 30, 2015, Korean Patent Application No. 10-2015-0180959 filed on Dec. 17, 2015, Korean Patent Application No. 10-2016-0082897 filed on Jun. 30, 2016, and Korean Patent Application No. 10-2016-0119881 filed on Sep. 20, 2016 in the Korean Intellectual Property Office (KIPO), the entire contents of which are hereby incorporated by reference.

BACKGROUND

1. Technical Field

The present disclosure relates to direct communication technologies, and more particularly, to operation methods of a communication node supporting vehicle communications based on a cellular system.

2. Related Art

A wireless access for vehicular environment (WAVE) protocol may be a protocol supporting vehicle communications and support vehicle to everything (V2X) communications. The V2X communications may include vehicle to vehicle (V2V) communications, vehicle to infrastructure (V2I) communications, vehicle to pedestrian (V2P) communications, in-vehicle networking (IVN) communications, and so on.

According to the WAVE protocol, seven channels may be supported in 5.85 to 5.925 gigahertz (GHz) frequency band (i.e., 75 megahertz (MHz) bandwidth). The seven channels may be used for the V2X communications. One channel among the seven channels may be used for transmitting and receiving control information and may be referred to as a control channel (CCH). The remaining six channels among the seven channels may be used for traffic safety related services, general commercial services, and so on, and may be referred to as a service channel (SCH).

In vehicle communication environments, coverage (e.g., communication range) of a roadside unit (RSU) may be overlapped with coverage of an adjacent RSU in order to guarantee continuity of services. A frequency used by the RSU may be different from a frequency used by the adjacent RSU. In this case, if services between the RSU and an onboard unit (OBU) and services between OBUs each of them belongs to different coverage are simultaneously provided, frequency interference may be occurred in a single physical layer.

Meanwhile, this description on the related arts is written for understanding of the background of the present disclosure. Thus, information on other than conventional technologies, which are already known to those skilled in this technology domain to which the technologies of the present disclosure belong, may be included in this description.

SUMMARY

Accordingly, embodiments of the present disclosure are provided to substantially obviate one or more problems due to limitations and disadvantages of the related art. The embodiments of the present disclosure provide operation methods of a communication node supporting vehicle communications based on a cellular system.

In accordance with the embodiments of the present disclosure, an operation method of a first user equipment (UE) supporting direct communications in a communication network is provided. The operation method comprises obtaining scheduling information configured for the direct communications from a first base station, wherein the first UE belongs to coverage of the first base station; identifying modulation and coding scheme (MCS) information and radio resource information included in the scheduling information; and transmitting, to a second UE, a first message to which a MCS indicated by the MCS information is applied through radio resources indicated by the radio resource information.

Here, a state of the first UE may be a radio resource control (RRC) connected state or a RRC idle state.

The scheduling information may be shared in the first base station and a second base station, and the second UE belongs to coverage of the second base station.

The radio resources indicated by the radio resource information may be configured based on a speed of a vehicle in which the first UE is located, vehicle density in a zone to which the first UE belongs, or service coverage of the direct communications.

The radio resource information may indicate radio resources which are selected by the first base station in a direct communication resource pool when a mode1 manner is used. Alternatively, the radio resource information may indicate the direct communication resource pool when a mode2 manner is used.

The MCS information may indicate a MCS index or a MCS range each of them is configured by the first base station.

The MCS indicated by the MCS information may be configured based on a speed of a vehicle in which the first UE is located, vehicle density in a zone to which the first UE belongs, or service coverage of the direct communications.

Here, communications between the first base station and the first UE may be performed through a Uu interface, and the direct communications between the first UE and the second UE may be performed through a PC5 interface.

The first base station may be a first roadside unit (RSU) belonging to a vehicle communication network, the first UE may be a first onboard unit (OBU) belonging to the vehicle communication network, and the second UE may be a second OBU belonging to the vehicle communication network.

In addition, the operation method may further comprise obtaining, from the first base station, a direct communication resource pool; performing a monitoring operation on radio resources belonging to the direct communication resource pool; and receiving, from the second UE, a second message based on the monitoring operation.

In addition, the operation method may further comprise requesting, to the first base station, allocation of additional radio resources for the direct communications when the radio resources are unavailable; obtaining, from the first base station, additional radio resource information; and transmitting, to the second UE, a third message through the additional radio resources indicated by the additional radio resource information.

The first UE may request the allocation of the additional radio resources to the first base station based on a random access procedure, a scheduling request procedure of a physical uplink control channel (PUCCH), or a buffer status report (BSR) procedure.

The additional radio resources may be selected among remaining radio resources except for radio resources, which are used for transmitting the first message, in the direct communication resource pool.

Furthermore, in accordance with the embodiments of the present disclosure, an operation method of a first user equipment (UE) supporting direct communications in a communication network is provided. The operation method comprises, when the direct communications between the first UE and a second UE are ended, transmitting a first message requesting end of the direct communications to a first base station; and performing, for the end of the direct communications, a release operation of radio resources with the first base station or a release operation of radio resource control (RRC) connection with the first base station, wherein the first UE belongs to coverage of the first base station, the first UE operates in a RRC connected state when the release operation of the radio resources is performed, or the first UE operates in a RRC idle state when the release operation of the RRC connection is performed.

In addition, the operation method may further comprise, when the direct communications between the first UE which operates in the RRC connected state and the second UE are requested, requesting allocation of radio resources for the direct communications to the first base station; obtaining radio resource information from the first base station; and transmitting a second message to the second UE through radio resources indicated by the radio resource information.

In addition, the operation method may further comprise, when the direct communications between the first UE which operates in the RRC idle state and the second UE are requested, selecting radio resources in a direct communication resource pool which is obtained from the first base station; and transmitting a third message to the second UE through the selected radio resources.

The direct communication resource pool may be configured based on a speed of a vehicle in which the first UE is located, vehicle density in a zone to which the first UE belongs, or service coverage of the direct communications.

The direct communication resource pool may be shared in the first base station and a second base station, and the second UE belongs to coverage of the second base station.

Here, a modulation and coding scheme (MCS) which is applied to the third message may be configured based on a speed of a vehicle in which the first UE is located, vehicle density in a zone to which the first UE belongs, or service coverage of the direct communications.

The first base station may be a first roadside unit (RSU) belonging to a vehicle communication network, the first UE may be a first onboard unit (OBU) belonging to the vehicle communication network, and the second UE may be a second OBU belonging to the vehicle communication network.

According to the embodiments of the present disclosure, the vehicle communications (e.g., V2V communications, V2I communications, V2P communications, IVN communications, and so on) can be supported based on the cellular system. In addition, a self-driving system, an intelligent transportation system (ITS), and so on can be efficiently established. Therefore, performance of a communication system can be enhanced.

BRIEF DESCRIPTION OF DRAWINGS

Embodiments of the present disclosure will become more apparent by describing in detail embodiments of the present disclosure with reference to the accompanying drawings, in which.

DETAILED DESCRIPTION OF THE EMBODIMENTS

Figure 1:
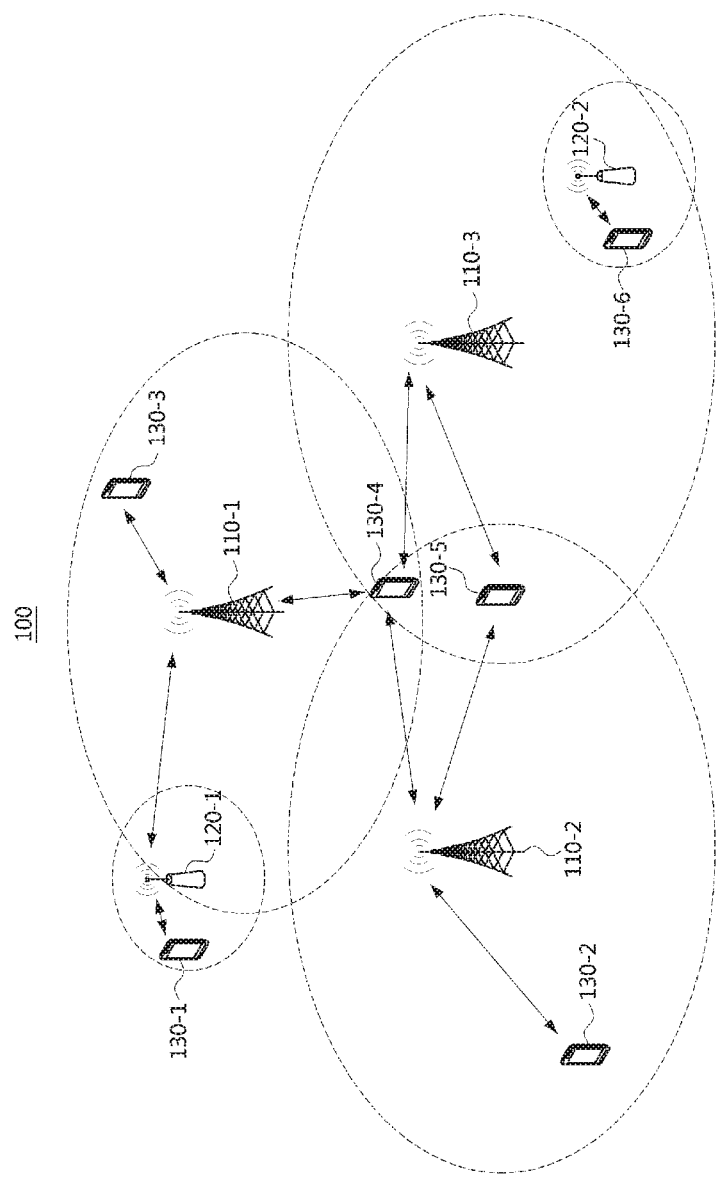
FIG. 1 is a conceptual diagram showing embodiments of a wireless communication network.

The present disclosure may be modified in various ways and the present disclosure may include various embodiments. The embodiments will be shown in figures and described in detail. However, the present disclosure is not limited to specific embodiments. It should be understood that the present disclosure includes all modifications, similar embodiments, and alternative embodiments belonging to idea and technical scope thereof.

The terms "first, second, and so on" will be used for describing various elements. However, the elements are not limited thereto. These terms are only used to distinguish one element from another. For example, a first element could be termed a second element, and, similarly, the second element could be termed the first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. On the contrary, in the case that an element is referred to as being "directly connected" or "directly coupled" to another element, it will be understood that there are no intervening elements.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including,"

when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

A wireless communication network to which embodiments according to the present disclosure are applied will be described. The wireless communication network to which the embodiments according to the present disclosure are applied is not limited to description below, and the embodiments according to the present disclosure may be applied to various wireless communication networks. The wireless communication network may indicate a wireless communication system.

FIG. 1 is a conceptual diagram showing embodiments of a wireless communication network.

As shown in FIG. 1, a wireless communication network 100 may include a plurality of communication nodes 110-1, 110-2, 110-3, 120-1, 120-2, 130-1, 130-2, 130-3, 130-4, 130-5, and 130-6. Each of the plurality of communication nodes may support at least one communication protocol. For example, each of the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, an orthogonal frequency division multiple access (OFDMA) based communication protocol, a single carrier-frequency division multiple access (SC-FDMA) based communication protocol, a non-orthogonal multiple access (NOMA) based communication protocol, a space division multiple access (SDMA) based communication protocol, a radio access technology (RAT) based communication protocol supporting multiple access based on beamforming technologies by massive antenna, and so on. Each of the plurality of communication nodes may have following structure.

Figure 2:
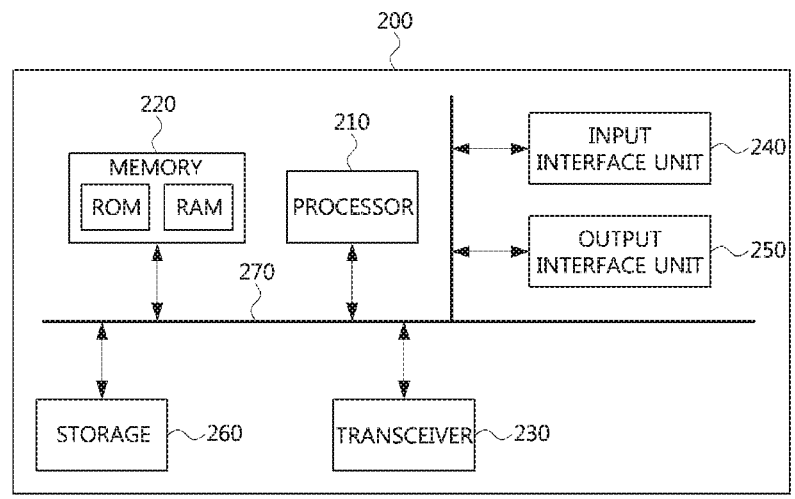
FIG. 2 is a block diagram showing embodiments of a communication node constituting a wireless communication network.

FIG. 2 is a block diagram showing embodiments of a communication node constituting a wireless communication network.

As shown in FIG. 2, a communication node 200 may include at least one processor 210, a memory 220, and a transceiver 230 connected to a network and performing communication. In addition, the communication node 200 may further include an input interface unit 240, an output interface unit 250, a storage 260, and so on. The respective components included in the communication node 200 may be connected via a bus 270 to communicate with each other.

The processor 210 may execute a program command stored in the memory 220 and/or the storage 260. The processor 210 may be a central processing unit (CPU), a graphics processing unit (GPU) or a dedicated processor in which the methods according to embodiments of the present disclosure are performed. Each of the memory 220 and the storage 260 may include a volatile storage medium and/or a nonvolatile storage medium. For example, the memory 220 may include a read only memory (ROM) and/or a random access memory (RAM).

As re-shown in FIG. 1, each of the plurality of communication nodes may be a base station or a user equipment (UE). Each of a first base station 110-1, a second base station 110-2, and a third base station 110-3 may form a macro cell. Each of a fourth base station 120-1 and a fifth base station 120-2 may form a small cell. The fourth base station 120-1, a UE3 130-3, and a UE4 130-4 may belong to coverage of the first base station 110-1. A UE2 130-2, the UE4 130-4, and a UE5 130-5 may belong to coverage of the second base station 110-2. The fifth base station 120-2, the UE4 130-4, the UE5 130-5, and a UE6 130-6 may belong to coverage of the third base station 110-3. The UE1 130-1 may belong to coverage of the fourth base station 120-1. The UE6 130-6 may belong to coverage of the fifth base station 120-2.

Each of the plurality of base stations 110-1, 110-2, 110-3, 120-1, and 120-2 may be referred to as a NodeB, an evolved NodeB (eNodeB), a base transceiver station (BTS), a radio base station, a radio transceiver, an access point, an access node, a road side unit (RSU), a radio remote head (RRH), a transmission point (TP), a transmission and reception point (TRP), a relay, and so on. Each of the plurality of UEs 130-1, 130-2, 130-3, 130-4, 130-5, and 130-6 may be referred to as a terminal, an access terminal, a mobile terminal, a station, a subscriber station, a mobile station, a portable subscriber station, a node, a device, an on board unit (OBU), and so on.

Each of the plurality of communication nodes 110-1, 110-2, 110-3, 120-1, 120-2, 130-1, 130-2, 130-3, 130-4, 130-5, and 130-6 may support long term evolution (LTE) (or, long term evolution-advanced (LTE-A)) defined in a cellular communication standard (e.g., 3rd generation partnership project (3GPP) standard). Each of the plurality of base stations 110-1, 110-2, 110-3, 120-1, and 120-2 may operate in different frequency bands or same frequency band. Each of the plurality of base stations 110-1, 110-2, 110-3, 120-1, and 120-2 may be connected to each other through an ideal backhaul link or a non-ideal backhaul link and exchange information each other through the ideal backhaul link or the non-ideal backhaul link. Each of the plurality of base stations 110-1, 110-2, 110-3, 120-1, and 120-2 may be connected to a core network (non-shown) through the ideal backhaul link or the non-ideal backhaul link. Each of the plurality of base stations 110-1, 110-2, 110-3, 120-1, and 120-2 may transmit a signal which is received from the core network to a specific UE 130-1, 130-2, 130-3, 130-4, 130-5, and 130-6 and may transmit a signal which is received from the specific UE 130-1, 130-2, 130-3, 130-4, 130-5, and 130-6 to the core network.

Each of the plurality of base stations 110-1, 110-2, 110-3, 120-1, and 120-2 may support downlink transmission based on OFDMA and uplink transmission based on SC-FDMA. In addition, each of the plurality of base stations 110-1, 110-2, 110-3, 120-1, and 120-2 may support multiple input multiple output (MIMO) transmission (e.g., single user-multiple input multiple output (SU-MIMO), multi user-multiple input multiple output (MU-MIMO), massive MIMO, and the like), coordinated multipoint (CoMP) transmission, carrier aggregation (CA) transmission, transmission in an unlicensed band, device to device (D2D) communications (e.g., proximity service (ProSe)), and so on.

Here, each of the plurality of UEs 130-1, 130-2, 130-3, 130-4, 130-5, and 130-6 may perform operations corresponding to or supported by the base station 110-1, 110-2, 110-3, 120-1, and 120-2.

For example, the second base station 110-2 may transmit a signal to the UE4 130-4 based on a SU-MIMO manner, and the UE4 130-4 may receive the signal from the second base station 110-2 based on the SU-MIMO manner. Alternatively, the second base station 110-2 may transmit a signal to the UE4 130-4 and the UE5 130-5 based on a MU-MIMO manner, and each of the UE4 130-4 and the UE5 130-5 may receive the signal from the second base station 110-2 based on the MU-MIMO manner. Each of the first base station 110-1, the second base station 110-2, and the third base station 110-3 may transmit a signal to the UE4 130-4 based on a CoMP manner, and the UE4 130-4 may receive the signal from the first base station 110-1, the second base station 110-2, and the third base station 110-3 based on the CoMP manner. Each of the plurality of the base stations 110-1, 110-2, 110-3, 120-1, and 120-2 may transmit or receive a signal to or from the UE 130-1, 130-2, 130-3, 130-4, 130-5, and 130-6 belonging to coverage of a corresponding base station based on a CA manner. Each of the first base station 110-1, the second base station 110-2, and the third base station 110-3 may coordinate the D2D communications between the UE4 130-4 and the UE5 130-5, and each of the UE4 130-4 and the UE5 130-5 may perform the D2D communications which are coordinated by each of the first base station 110-1, the second base station 110-2, and the third base station 110-3.

Next, operation methods of the communication node in the wireless communication network will be described. Although a method (e.g., signal transmission or reception) performed by a first communication node will be described, a second communication node corresponding thereto may perform a method (e.g., signal reception or transmission) corresponding to the method performed by the first communication node. That is, when an operation of the UE is described, the base station corresponding thereto may perform an operation corresponding to the operation of the UE. On the contrary, when an operation of the base station is described, the UE may perform an operation corresponding to an operation of the base station.

Meanwhile, public safety communication technologies (e.g., disaster communication technologies) based on a LTE/LTE-A system may include an earthquake and tsunami warning system (ETWS), a public warning system (PWS), the D2D communications (e.g., ProSe), a group communication service (GCSE), and so on. In the D2D communications and the GCSE, communications may be performed through radio channels between UEs without passing through the base station. Functions of the D2D communications may be divided to a function of commercial service, a function of public safety, and so on. Scenarios of the D2D communications may be as follows.

Figure 3:
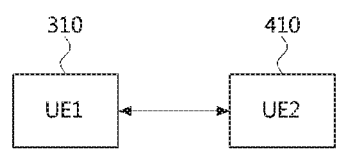
FIG. 3 is a concept diagram showing a first scenario of D2D communications.

FIG. 3 is a concept diagram showing a first scenario of D2D communications.

As shown in FIG. 3, each of a UE1 310 and a UE2 410 may be located out of coverage of a base station. For example, in the case of that a message which will be transmitted to the UE2 410 exists, the UE1 310 may directly transmit the message to the UE2 410. In addition, the UE1 310 may directly receive a message from the UE2 410. That is, each of the UE1 310 and the UE2 410 may transmit or receive the message based on the D2D communications. Resource allocation operations and control signaling operations for the D2D communications may be basically performed based on a distributed control manner.

Figure 4:
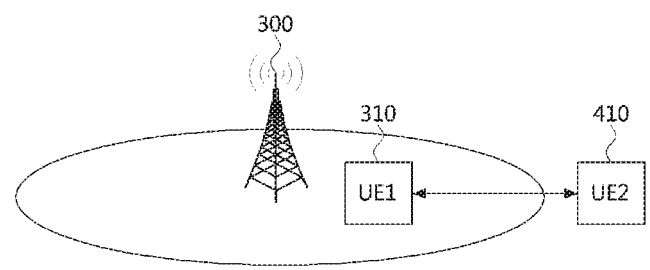
FIG. 4 is a concept diagram showing a second scenario of D2D communications.

FIG. 4 is a concept diagram showing a second scenario of D2D communications.

As shown in FIG. 4, a UE1 310 may be located in coverage of a first base station 300, and a UE2 410 may be located out of the coverage of the first base station 300. This case may be referred to as a "partial coverage scenario." For example, in the case of that a message which will be transmitted to the UE2 410 exists, the UE1 310 may directly transmit the message to the UE2 410. In addition, the UE1 310 may directly receive a message from the UE2 410. That is, each of the UE1 310 and the UE2 410 may transmit or receive the message based on the D2D communications. The resource allocation operations and the control signaling operations for the D2D communications may be performed based on the distributed control manner or a base station-based control manner (or, network-based control manner).

Figure 5:
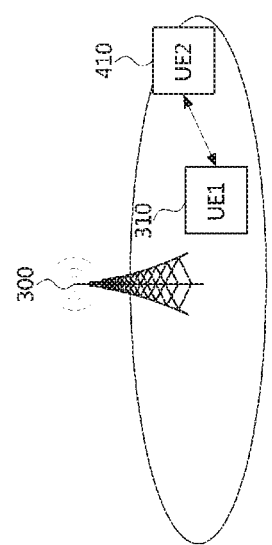
FIG. 5 is a concept diagram showing a third scenario of D2D communications.

FIG. 5 is a concept diagram showing a third scenario of D2D communications.

AS shown in FIG. 5, each of a UE1 310 and a UE2 410 may be located in coverage of a base station 300. For example, in the case of that a message which will be transmitted to the UE2 410 exists, the UE1 310 may directly transmit the message to the UE2 410. In addition, the UE1 310 may directly receive a message from the UE2 410. That is, each of the UE1 310 and the UE2 410 may transmit or receive the message based on the D2D communications. In the case of that the UEs 310 and 410 are located in the coverage of the first base station 300, the resource allocation operations and the control signaling operations for the D2D communications may be basically performed based on the base station-based control manner (or, network-based control manner).

Figure 6:
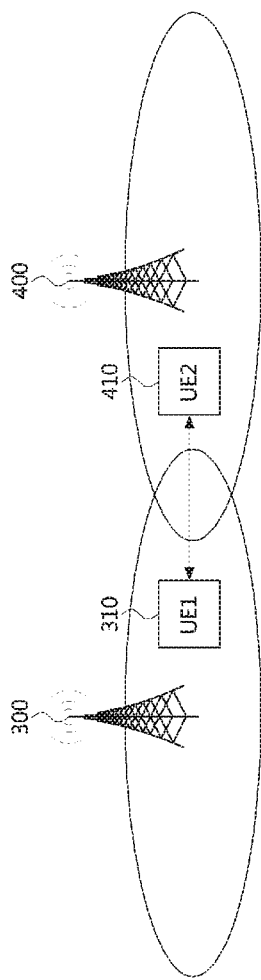
FIG. 6 is a concept diagram showing a fourth scenario of D2D communications.

FIG. 6 is a concept diagram showing a fourth scenario of D2D communications.

As shown in FIG. 6, a UE1 310 may be located in coverage of a first base station 300, and a UE2 410 may be located in coverage of a second base station 400. For example, in the case of that a message which will be transmitted to the UE2 410 exists, the UE1 310 may directly transmit the message to the UE2 410. In addition, the UE1 310 may directly receive a message from the UE2 410. That is, each of the UE1 310 and the UE2 410 may transmit or receive the message based on the D2D communications. In the case of that the UEs 310 and 410 are located in the coverage of the base stations 300 and 400, the resource allocation operations and the control signaling operations for the D2D communications may be basically performed based on the base station-based control manner (or, network-based control manner).

Meanwhile, the D2D communications may support a voice service in the LTE/LTE-A system and may support the voice service based on a single quality of service (QoS). The UE supporting the D2D communications may transmit data using a broadcast manner or a multicast manner instead of a unicast manner. In the case of that the UE is located in the coverage of the base station, the D2D communications may be performed based on a mode1. In the case of that the mode1 is used in the D2D communications, the base station may inform the UE of resource information (e.g., radio resource information) used for the D2D communications. For example, the base station may allocate available resources (e.g., available radio resources) in a D2D communication resource pool for the UE. The UE may perform the D2D communications using the resource (e.g., radio resources) allocated by the base station. Therefore, the D2D communications may be performed without collisions between UEs.

In the case of that the UE is located out of the coverage of the base station, the D2D communications may be performed based on a mode2. In the case of that the mode2 is used in the D2D communications, the UE may randomly select resources (e.g., radio resources) in the D2D communication resource pool and perform the D2D communications using the selected resources (e.g., selected radio resources). Because the resources (e.g., radio resources) used for the D2D communications are randomly selected, collisions between UEs may be occurred.

In the partial coverage scenario, the D2D communications may be performed based on the mode1 or the mode2. Criterions for mode selection may be predefined. In this case, the UE may select the mode1 or the mode 2 based on the predefined criterions and perform the D2D communications using resources (e.g., radio resources) determined by the selected mode.

Direct communications may be performed based on the foregoing D2D communication technologies. The direct communications may include the D2D communications, vehicle communications, machine type communication (MTC), machine to machine (M2M) based communications, internet of things (IoT) based communications, and so on. The vehicle communications may be vehicle to everything (V2X) communications. The V2X communications may include vehicle to vehicle (V2V) communications, vehicle to infrastructure (V2I) communications, vehicle to pedestrian (V2P) communications, in-vehicle networking (IVN) communications, and so on. Communications between OBUs, communications between the OBU and the RSU, and communications between RSUs may be performed based on the D2D communication technologies. Discovery services, communication services, and so on between communication nodes may be provided based on the vehicle communications.

In embodiments which will be described below, the RSU may be the communication system, the base station, and the like, and the OBU may be the UE, and the like. The UE may be a UE owned by a pedestrian, a UE owned by a user using a means of transportation (e.g., vehicle, motorcycle, bicycle, wheelchair, baby carriage, and the like), and so on. User information (e.g., information indicating whether an owner of the UE is a pedestrian, information indicating whether an owner of the UE is a user of the means of transportation, and so on) may be automatically configured based on sensors (e.g., gyro sensor, and on the like) embedded in the UE or measurement functions of the UE (e.g., function which measures moving distance per unit of an hour, function which measures change of received signal strength, and so on). Alternatively, the user information may be configured according to an input of the user of the UE.

In the case of that the mode1 is used, the vehicle communications may be performed using resources scheduled by the base station (e.g., communication system, RSU). In the case of that the mode2 is used, the vehicle communications may be performed using resources which are randomly selected in a vehicle communication resource pool configured by the base station. The vehicle communication resource pool may be identical to or different from the foregoing D2D communication resource pool.

In the case of that the mode1 is used, the OBU (or, UE) may operate in a radio resource control (RRC) connected state, and the base station may control management and allocation of resources. For example, the base station may directly configure the mode (e.g., mode1 or mode2) of the vehicle communications. In the case of that data to be transmitted is generated, the OBU which operates in a RRC idle state may transit the state of it. That is, the state of the OBU may be transited from the RRC idle state to the RRC connected state. The OBU which operates in the RRC connected state may request allocation of resources for the vehicle communications to the base station. The OBU which operates in the RRC connected state may transmit a buffer status report (BSR) to the base station, if needed. In the case of that the allocation of resources for the vehicle communications is requested form the OBU, the base station may allocate available resources in the vehicle communication resource pool for the OBU. The OBU may transmit data using resources allocated by the base station. In addition, the base station may allocate resources for the OBU which operates in the RRC idle state based on a semi-persistence scheduling (SPS) manner. In this case, the OBU which operates in the RRC idle state may transmit data using resources allocated by the base station without collisions.

In the case of that the mode2 is used, regardless of the state (e.g., RRC connected state or RRC idle state) of the OBU (or, UE), the OBU may randomly select resources in the vehicle communication resource pool configured by the base station and transmit data using the selected resources. Meanwhile, the OBU may receive a synchronization signal from other communication node (e.g., base station, RSU, OBU, UE, and so on) and transmit data using resources which are selected in the vehicle communication resource pool after adjusting synchronization of it based on the received synchronization signal. The synchronization signal may be transmitted, from an arbitrary communication node (e.g., base station, RSU, OBU, UE, and so on), through resources configured for transmission of the synchronization signal in the broadcast manner. In the case of that the synchronization signal is not detected, the OBU may transmit the synchronization signal of itself. That is, the OBU may operate in a synchronization source.

In the below, a manner in which resources for the direct communications (e.g., D2D communications, vehicle communications, and so on) are allocated by the base station may be referred as to a "mode1 manner." The resources which are allocated based on the mode1 manner may be referred to as "mode1 resources." A manner in which resources for the direct communications (e.g., D2D communications, vehicle communications, and so on) are randomly selected by the OBU in the preconfigured vehicle communication resource pool may be referred to as a "mode2 manner." The resources which are selected based on the mode2 manner may be referred to as "mode2 resources."

Meanwhile, a message which is periodically generated in the vehicle communications (hereafter, "periodic message") may be transmitted using the mode1 resources regardless of the state (e.g., RRC connected state or RRC idle state) of the OBU. A message which is generated according to occurrence of a specific event (hereafter, "aperiodic message") may be transmitted using the mode2 resources. The aperiodic message may be transmitted using the mode1 resources according to attributes of required reliability, service coverage, latency, and so on.

The OBU may include an access stratum (AS) layer block supporting functions of a protocol layer for radio access (e.g., AS layer) and a non-access stratum (NAS) layer block supporting functions of a higher layer (e.g., NAS layer or application layer). The AS layer may be a physical layer (e.g., layer1), a medium access control (MAC) layer (e.g., layer2), or a RRC layer.

The OBU may cancel or omit the transmission of the periodic message. For example, in a first case of that radio resources for the transmission of the periodic message are not allocated, a second case of that radio resources for the transmission of the periodic message are not selected, or a third case of that an instruction (e.g., predefined criterion) of the higher layer which requests cancellation or omission the transmission of the periodic message exits, the transmission of the periodic message may be canceled or omitted. In the case of that the transmission of the periodic message is canceled, omitted, or failed by other reasons, the OBU may transmit the periodic message in an aperiodic manner. Alternatively, the OBU may transmit an updated periodic message in a next transmission period (or, next transmission time).

Concretely, the AS layer block may obtain the periodic message from the NAS layer block and transmit the periodic message according to a preconfigured period. In the case of that the periodic message is not transmitted, the AS layer block (e.g., physical layer block, MAC layer block, or RRC layer block included in the AS layer block) may transmit a signaling parameter (or, primitive message between layer blocks included in the OBU) or a differently defined control message, each of them indicates the transmission failure (or, transmission cancellation, transmission omission) of the periodic message, to the NAS layer block (e.g., block supporting control functions). In addition, reasons of the transmission failure (or, transmission cancellation, transmission omission) of the periodic message may also be reported to the NAS layer block.

The NAS layer block may identify the transmission failure (or, transmission cancellation, transmission omission) of the periodic message by receiving the signaling parameter or the control message from the AS layer block. Alternatively, the NAS layer block may identify the transmission failure (or, transmission cancellation, transmission omission) of the periodic message based on other methods. In this case, the NAS layer block may instruct (e.g., trigger) the AS layer block to transmit the periodic message in the aperiodic manner. Alternatively, the NAS layer block may instruct (e.g., trigger) the AS layer block to transmit the updated periodic message in the next transmission period (or, next transmission time). Alternatively, the NAS layer block may instruct (e.g., trigger) the AS layer block to omit the transmission of the periodic message.

Meanwhile, the NAS layer block may adjust occurrence frequency (or, transmission period) of the periodic message. In addition, the NAS layer block may maintain and manage updated latest information and control a transmission of the updated latest information in the next transmission period (or, next transmission time). The NAS layer block may transmit the occurrence frequency information (or, transmission period information) of the periodic message and the control information related to maintenance/management/transmission of the updated latest information to the AS layer block through a signaling parameter (or, primitive message between layer blocks included in the OBU) or a differently defined control message.

The NAS layer block may adjust the occurrence frequency (or, transmission period) of the periodic message based on pre-obtained a movement speed of the OBU (or, UE), a radio channel environment, reasons of transmission failure (or, transmission cancellation, transmission omission) of the periodic message, and so on. Alternatively, the NAS layer block may transmit, to the AS layer block, a signaling parameter (or, primitive message between layer blocks included in the OBU) or a differently defined control message each of them requests a report of the movement speed of the OBU, the radio channel environment, the reasons of transmission failure (or, transmission cancellation, transmission omission) of the periodic message, and so on. In addition, the NAS layer block may adjust the occurrence frequency (or, transmission period) of the periodic message based on the movement speed of the OBU, the radio channel environment, the reasons of transmission failure (or, transmission cancellation, transmission omission) of the periodic message, and so on which are reported from the AS layer block.

The AS layer block may obtain the occurrence frequency information (or, transmission period information) of the periodic message and the control information related to maintenance/management/transmission of the updated latest information from the NAS layer block. The AS layer block may transmit the periodic message according to the occurrence frequency (or, transmission period). The AS layer block may maintain/manage/transmit the updated latest information based on the control information. The AS layer block may transmit a transmission result of the periodic message and a maintenance/management/transmission result of the updated latest information to the NAS layer block. In addition, according to a request of the NAS layer block, the AS layer block may report the movement speed of the OBU, the radio channel environment, the reasons of transmission failure (or, transmission cancellation, transmission omission) of the periodic message, and so on to the NAS layer block.

Meanwhile, the foregoing adjustment operations of the occurrence frequency (or, transmission period) of the periodic message and operations related to maintenance/management/transmission of the updated latest information may be performed in the RRC layer block belonging to the AS layer block instead of the NAS layer block. In this case, the NAS layer block may transmit control information related to adjustment of the occurrence frequency (or, transmission period) of the periodic message and control information related to maintenance/management/transmission of the updated latest information to the RRC layer block. The RRC layer block may adjust the occurrence frequency (or, transmission period) of the periodic message using the control information obtained from the NAS layer block and perform the operations related to maintenance/management/transmission of the updated latest information. For example, the RRC layer block may transmit, to the MAC layer block and the physical layer block, a signaling parameter (or, primitive message between layer blocks included in the OBU) or a differently defined control message each of them requests to perform operations based on the adjusted occurrence frequency (or, adjusted transmission period) of the periodic message. In addition, the RRC layer block may transmit, to the MAC layer block and the physical layer block, a signaling parameter (or, primitive message between layer blocks included in the OBU) or a differently defined control message each of them requests to perform operations related to maintenance/management/transmission of the updated latest information. In the case of that the signaling parameter (or, primitive message between layer blocks included in the OBU) or the differently defined control message is received from the RRC layer block, each of the MAC layer block and the physical layer block may adjust the occurrence frequency (or, transmission period) of the periodic message and perform the operations related to maintenance/management/transmission of the updated latest information based on the request of the RRC layer block.

Meanwhile, adjustment conditions of the occurrence frequency (or, transmission period) of the periodic message, conditions of transmission cancellation (or, transmission omission) of the periodic message, and so on may be predefined based on a control massage of the NAS layer or a RRC control message (e.g., control information of the RRC layer). In the case of that a current state is satisfied with the predefined conditions, the AS layer block (e.g., RRC layer block, MAC layer block, physical layer block) may adjust the occurrence frequency (or, transmission period) of the periodic message and cancel (or, omit) the transmission of the periodic message. In this case, the AS layer block may report an adjustment result of the occurrence frequency (or, transmission period) of the periodic message and a result of the transmission cancellation (or, transmission omission) of the periodic message to the NAS layer block.

Next, transmission methods of the periodic message performed in the communication node (e.g., OBU, UE) will be described. In a first case of that the mode1 resources are not allocated, a second case of that the mode2 resources are not selected, or a third case of that the transmission of the periodic message is failed (or, canceled, omitted), following transmission methods may be used.

Figure 7:
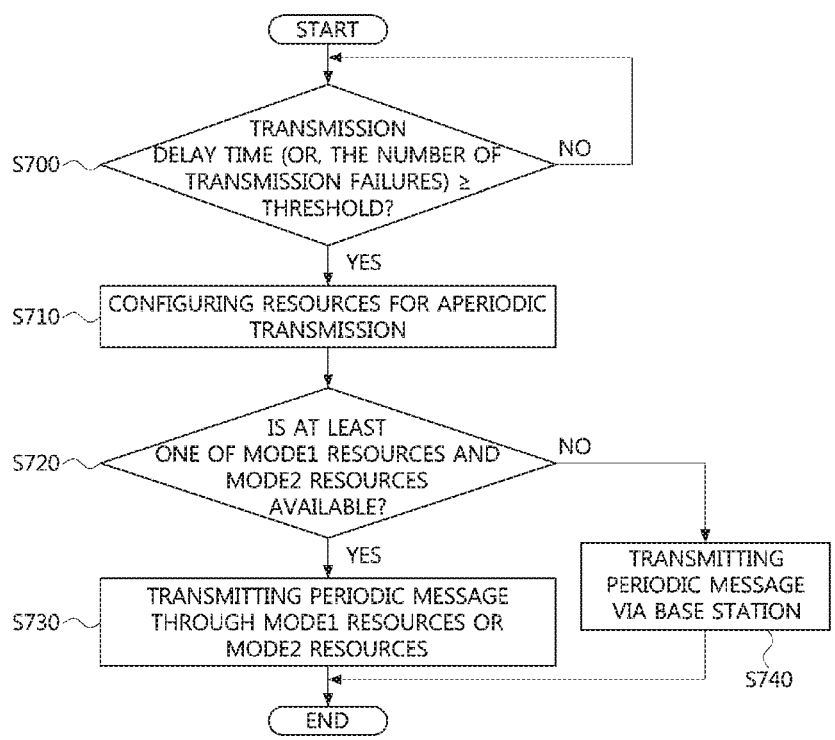
FIG. 7 is a flow chart showing a method for transmitting a periodic message performed in a communication node.

FIG. 7 is a flow chart showing a method for transmitting a periodic message performed in a communication node.

As shown in FIG. 7, an OBU (or, UE) may compare a transmission delay time of the periodic message with a predefined transmission delay time (alternatively, the OBU (or, UE), or may compare the number of transmission failures of the periodic message with the predefined number of transmission failures) (S700). Each of the predefined transmission delay time and the predefined number of transmission failures may be configured based on a priority, an attribute, and so on of the periodic message. The OBU may acquire the predefined transmission delay time and the predefined number of transmission failures through system information (or, differently defined control message).

In the case of that the transmission delay time of the periodic message is equal to or more than the predefined transmission delay time (or, the number of transmission failures of the periodic message is equal to or more than the predefined number of transmission failures), an aperiodic transmission may be triggered. In the case of that the aperiodic transmission is triggered, the OBU may configure resources for the aperiodic transmission (S710). For example, the OBU may obtain mode1 resources allocated by the base station. The mode1 resources may be allocated based on the foregoing mode1 manner. In addition, the OBU may report latest information, the transmission delay time, the number of transmission failures, reasons of transmission failure, and so on of the periodic message through an allocation procedure of the mode1 resources.

Alternatively, the OBU may select mode2 resources. The mode2 resources may be selected based on the foregoing mode2 manner. In addition, the OBU may report the latest information, the transmission delay time, the number of transmission failures, reasons of transmission failure, and so on of the periodic messages through a selection procedure of the mode2 resources. In addition, the OBU may obtain uplink resources allocated by the base station. For example, the OBU may obtain the uplink resources by performing a requesting procedure of the uplink resources (e.g., requesting procedure of scheduling) or an access procedure.

The OBU may determine whether the mode1 resources or the mode2 resources are available (S720). The OBU may transmit the periodic message using the mode1 resources when the mode1 resources are available (alternatively, the OBU may transmit the periodic message using the mode2 resources when the mode2 resources are available) (S730). On the other hand, in the case of that both the mode1 resources and the mode2 resources are unavailable, the periodic message may be transmitted via the base station (S740). For example, the OBU may report the latest information, the transmission delay time, the number of transmission failures, reasons of transmission failure, and so on of the periodic message to the base station using the uplink resources. In the case of that the latest information, and so on of the periodic message is received from the OBU, the base station may transmit the periodic message including the latest information to other communication node (e.g., OBU, UE, RSU, base station). In this case, the base station may transmit the periodic message through downlink resources in the broadcast manner, multicast manner, or unicast manner. Alternatively, the base station may transmit the periodic message using PC5 interface for the vehicle communications.

Figure 8:
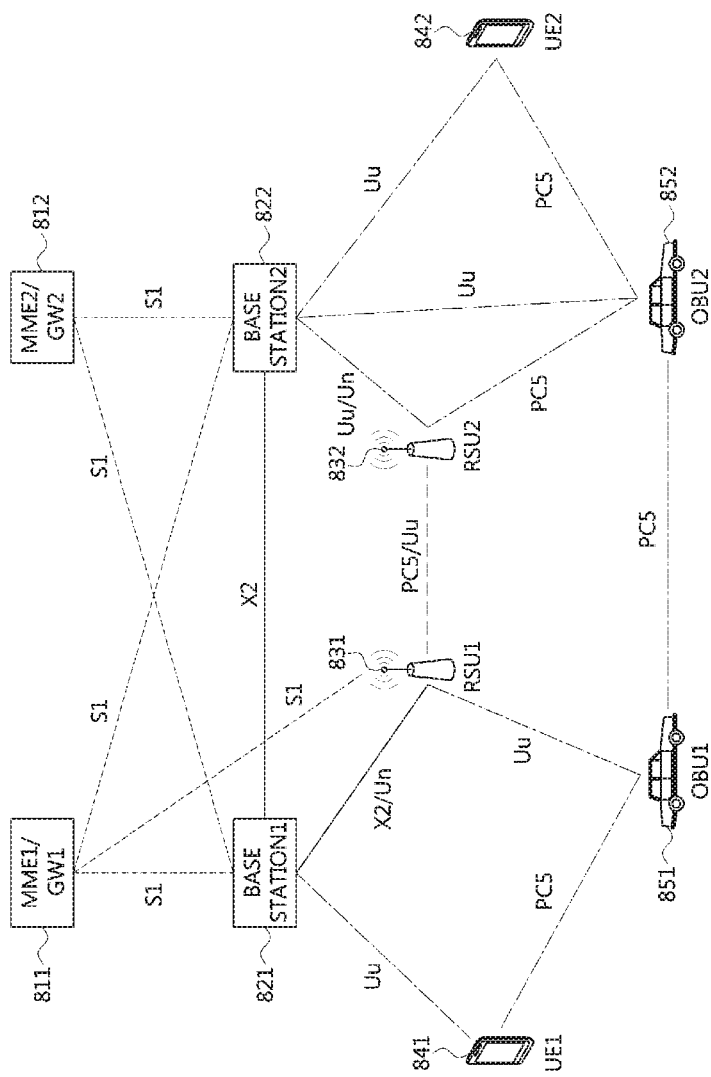
FIG. 8 is a concept diagram showing embodiments of a vehicle communication network.

FIG. 8 is a concept diagram showing embodiments of a vehicle communication network.

As shown in FIG. 8, a mobility management entity 1/gateway 1 (MME1/GW1) 811, a MME2/GW2 812, a base station1 821, a base station2 822, a RSU1 831, a RSU2 832, a UE1 841, a UE2 842, an OBU1 851, an OBU2 852, and so on may support the direct communications (e.g., D2D communications, vehicle communications). Each of the base station1 821 and the base station2 822 may be connected to the MME1/GW1 811, the MME2/GW2, and so on through S1 interface. Each of the base station1 821 and the base station2 822 may transmit or receive control information to or from the MME1/GW1 811, the MME2/GW2, and so on through a control plane and may transmit or receive data to or from the MME1/GW1 811, the MME2/GW2, and so on through a data plane. The base station1 821 may be connected to the base station2 822 through X2 interface.

The RSU1 831 supporting base station-functions may be connected to the base station1 821 through X2 interface and the MME1/GW1 811 through S1 interface. The RSU1 831 may perform transmission and reception operations of control information/data through X2 interface and S1 interface. Here, S1 interface may be a logical interface, and the RSU1 831 may be physically connected to the MME1/GW1 811 via the base station1 821. Alternatively, the RSU1 831 supporting relay-functions (e.g., L3/L2 relay-functions) may be connected to the base station1 821 through Un interface and may perform the transmission and reception operations of the control information/data through Un interface. Alternatively, the RSU1 831 supporting UE-functions (or, OBU-functions) may be connected to the base station1 821 through Uu interface and may perform the transmission and reception operations of the control information/data through Uu interface.

The RSU2 832 supporting the relay-functions (e.g., L3/L2 relay-functions) may be connected to the base station2 822 through Un interface and may perform the transmission and reception operations of the control information/data through Un interface. Alternatively, the RSU2 832 supporting the UE-functions (or, OBU-functions) may be connected to the base station2 822 through Uu interface and may perform the transmission and reception operations of the control information/data through Uu interface. The RSU1 831 may be connected to the RSU2 832 through PC5 interface or Uu interface. The transmission and reception operations of the control information/data between the RSU1 831 and the RSU2 832 may be performed through PC5 interface or Uu interface.

The UE1 841 may be connected to the base station1 821 through Uu interface and the OBU1 851 through PC5 interface. The UE1 841 may perform the transmission and reception operations of the control information/data through Uu interface and PC5 interface. The UE2 842 may be connected to the base station2 822 through Uu interface and the OBU2 852 through PC5 interface. The UE2 842 may perform the transmission and reception operations of the control information/data through Uu interface and PC5 interface.

The OBU1 851 may be connected to the RSU 831 supporting the base station-functions (or, relay-functions) through Uu interface, the UE1 841 through PC5 interface, and the OBU2 852 through PC5 interface. The OBU1 851 may perform the transmission and reception operations of the control information/data through Uu interface and PC5 interface. The OBU2 852 may be connected to the base station2 822 through Uu interface, the RSU2 832 supporting the UE-functions (or, OBU-functions) through PC5 interface, the UE2 842 through PC5 interface, and the OBU1 851 through PC5 interface. The OBU2 852 may perform the transmission and reception operations of the control information/data through Uu interface and PC5 interface.

Here, PC5 interface may be PC5 interface for the D2D communications in the LTE/LTE-A system or radio interface for the direct communications (e.g., PC5 interface for the vehicle communications) between communication nodes (e.g., RSU, OBU, UE, and so on) in a vehicle communication network.

Figure 9:
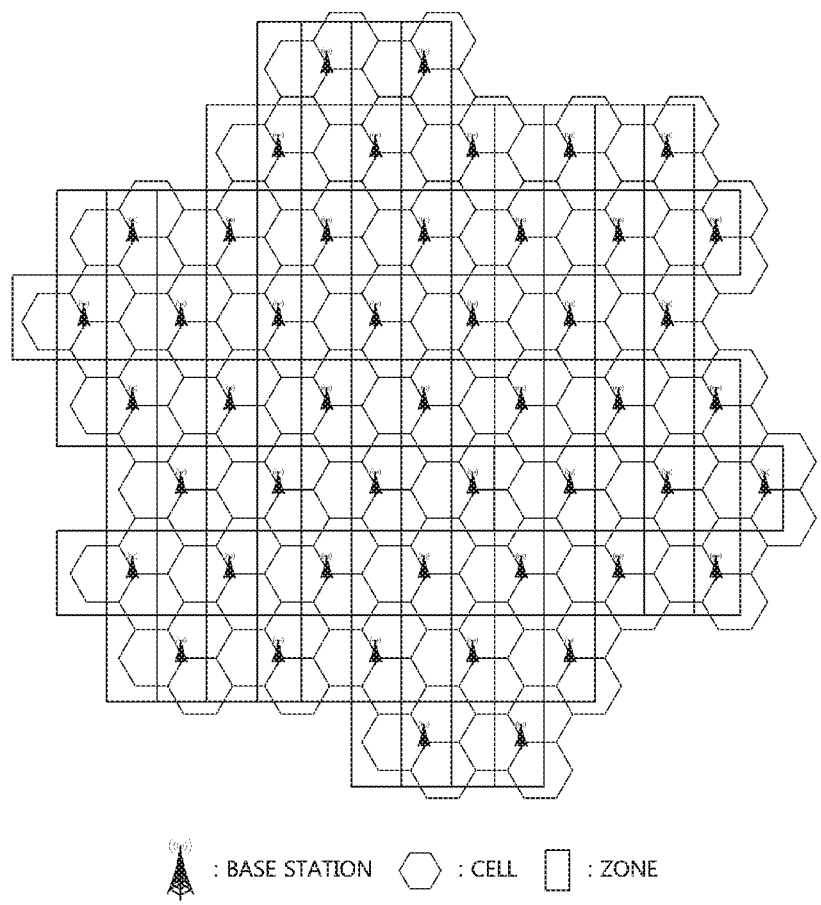
FIG. 9 is a concept diagram showing deployment scenarios of a cellular communication network.

FIG. 9 is a concept diagram showing deployment scenarios of a cellular communication network.

As shown in FIG. 9, a base station may manage a plurality of cells (e.g., three cells). Each of the plurality of cells may be operated by same operator or different operators. In addition, the cellular communication network may be divided to a plurality of zones. The plurality of cells and the base station may be located in each zone. Alternatively, the base station may not be located in each zone. The zone may be identical to a zone of the vehicle communication network which will be described below.

Figure 10:
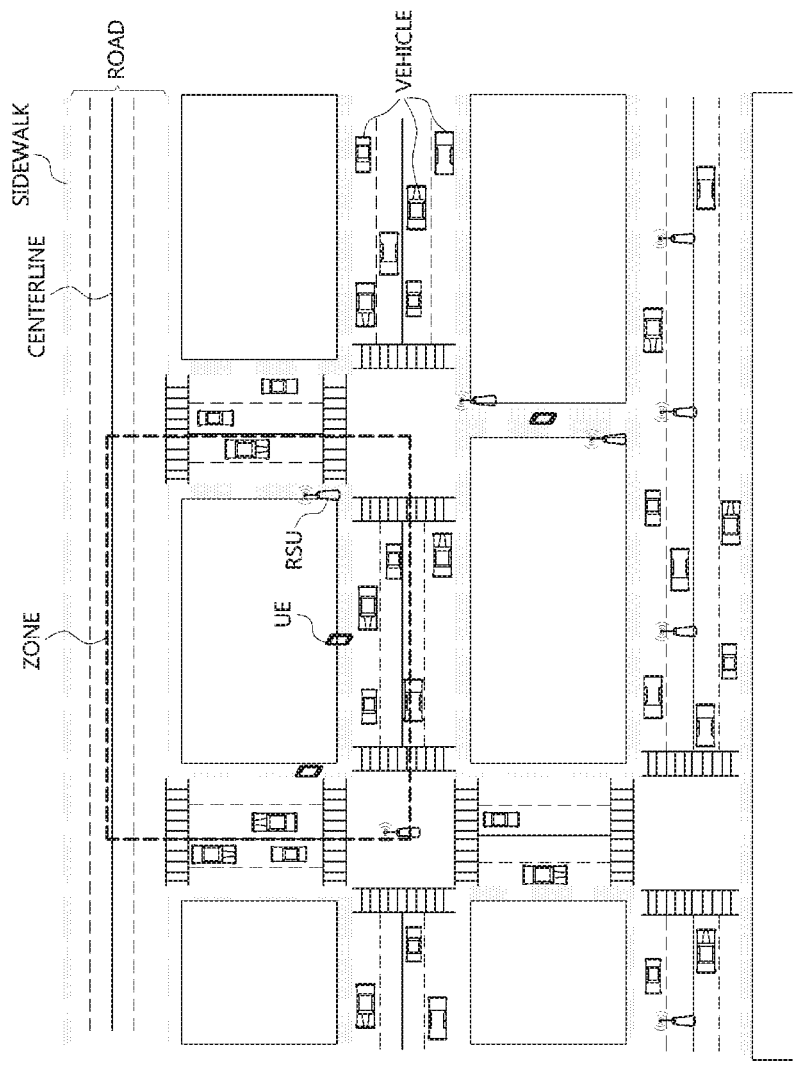
FIG. 10 is a concept diagram showing deployment scenarios of a vehicle communication network.

FIG. 10 is a concept diagram showing deployment scenarios of a vehicle communication network.

As shown in FIG. 10, the vehicle communication network may include a base station, a RSU, an OBU, a UE, and so on. The RSU may be located in a traffic signal lamp, a traffic sign, a structure on a road, a structure which is adjacent to the road (e.g., streetlight, telegraph pole, roadside tree, and the like), a building which is adjacent to the road, a centerline of the road, and so on. The RSU may perform the base station-functions, the relay-functions, or the UE-functions (or, OBU-functions). The OBU may be located in the means of transportation. The UE may be a UE owned by a pedestrian, a UE owned by a user using the means of transportation.

The zone may include at least one RSU, at least one OBU, at least one UE, and so on. The zone may be configured in consideration of a movement speed, density, a movement path, and so on of a vehicle (or, OBU, UE). For performing efficiently the direct communications (e.g., D2D communications, vehicle communications, and so on) in a single zone, frequency information (e.g., bandwidth, center frequency, and so on), configuration information of the physical layer (e.g., configuration information of synchronization signal, reference signal, pilot signal, and so on), configuration/deployment information of resource elements (or, resource blocks) in a radio frame (or, subframe), configuration/mapping information of a direct communication resource pool, and so on may be exchanged in cells. Therefore, cells in the single zone may be operated identically. Here, the direct communication resource pool may be a D2D communication resource pool, a vehicle communication resource pool, and so on. In addition, the direct communication resource pool may include a resource pool for discovery operations, a resource pool for data communications, and so on.

Though an operator of each cell in the single zone or neighboring zones is different each other (e.g., inter-public land mobile network (PLMN)), an operator to which each OBU (or, UE) subscribes is different each other, or a vendor of each vehicle is different each other, the foregoing information (e.g., frequency information, configuration information of the physical layer, configuration/deployment information of the resource elements (or, resource blocks) in the radio frame (or, subframe), configuration/mapping information of the direct communication resource pool, and so on) may be used identically so that the vehicle communications are available. In addition, the transmission and reception operations of the control information/data may be performed based on same access procedure.

Meanwhile, the resources for the direct communications in the vehicle communication network (e.g., vehicle communication resource pool) may be configured based on the foregoing mode1 manner or mode2 manner. In the vehicle communication network, an edge node (e.g., base station, cell, access point, RSU, and so on) may configure the vehicle communication resource pool based on at least one following parameter. Here, the vehicle communication resource pool for respective vehicles (or, OBUs, UEs) or respective zones may be configured.

Road-related parameter (e.g., width of roadway, the number of roadways, the number of intersections, type of intersection, type of road (e.g., city street, trunk road, side road, motorway, highway, and so on), state of road (e.g., freezing, inundation, and so on), accident situation, and so on)

Vehicle-related parameter (e.g., the number of vehicles (or, OBUs, UEs), density of vehicle (or, OBU, UE) (e.g., the number of vehicles (or, OBUs, UEs) per unit area), a movement speed (e.g., average movement speed) of vehicle (or, OBU, UE), a movement path of vehicle (or, OBU, UE), and so on)

Service-related parameter (e.g., coverage of respective services (e.g., effective range of respective services), transmission reliability, and so on)

Message-related parameter (e.g., transmission manner of message (e.g., periodic manner, aperiodic manner (or, event manner), and so on), characteristic of data included in message (e.g., priority, size, type, and so on of data), and so on)

Operating time-related parameter (e.g., office-going hour, closing hour, weekday, weekend, and so on)

For example, in the case of that it is anticipated that a large number of vehicles (or, OBUs, UEs) exist based on the road-related parameter, the vehicle communication resource pool may be configured to include relatively many resources. On the contrary, in the case of that it is anticipated that a small number of vehicles (or, OBUs, UEs) exist based on the road-related parameter, the vehicle communication resource pool may be configured to include relatively few resources.

In the case of that it is anticipated that a large number of vehicles (or, OBUs, UEs) exist based on the vehicle-related parameter, the vehicle communication resource pool may be configured to include relatively many resources. On the contrary, in the case of that it is anticipated that a small number of vehicles (or, OBUs, UEs) exist based on the vehicle-related parameter, the vehicle communication resource pool may be configured to include relatively few resources. In addition, in the case of that a speed of the vehicle is equal to or less than predefined threshold (or, density of vehicle is more than predefined threshold), the vehicle communication resource pool may be configured to include relatively many resources. On the contrary, in the case of that a speed of vehicle is more than predefined threshold (or, density of vehicle is equal to or less than predefined threshold), the vehicle communication resource pool may be configured to include relatively few resources.

Here, the OBU (or, UE) may report the vehicle-related parameter to the base station (or, RSU). In addition, a server which is connected to the OBU may estimate the vehicle-related parameter based on information obtained from a navigation system of the vehicle and report the estimated vehicle-related parameter to the base station. Alternatively, in the case of that sensors or image devices (e.g., closed circuit television (CCTV), camera, and the like) are installed in the base station, the base station may estimate the vehicle-related parameter using the sensors or the image devices.

In the case of that it is determined that a service has relatively broad coverage based on the service-related parameter, the vehicle communication resource pool may be configured to include relatively many resources. On the contrary, in the case of that it is determined that a service has relatively narrow coverage based on the service-related parameter, the vehicle communication resource pool may be configured to include relatively few resources.

In the case of that it is determined that many data to be transmitted exist based on the message-related parameter, the vehicle communication resource pool may be configured to include relatively many resources. On the contrary, in the case of that it is determined that few data to be transmitted exist based on the message-related parameter, the vehicle communication resource pool may be configured to include relatively few resources.

In the case of that it is anticipated that a large number of vehicles (or, OBUs, UEs) exist based on the operating time-related parameter, the vehicle communication resource pool may be configured to include relatively many resources. On the contrary, in the case of that it is anticipated that a small number of vehicles (or, OBUs, UEs) exist based on the operating time-related parameter, the vehicle communication resource pool may be configured to include relatively few resources.

In addition, the base station may configure the vehicle communication resource pool so that reuse of resources is available. For example, the base station may configure the vehicle communication resource pool so that different resources are allocated to each of consecutive zones in order to reduce interferences in the vehicle communications. The base station may configure the vehicle communication resource pool so that same resources are allocated to separated zones (i.e., non-consecutive zones).

The base station may transmit the configuration information of the vehicle communication resource pool to the OBU through the system information or a dedicated control message. The configuration information of the vehicle communication resource pool may include at least one of system bandwidth, transmission bandwidth, frequency resource information (e.g., subcarrier index, and the like), time resource information (e.g., subframe index, slot index, symbol index, and the like), resource allocation period, information on use authority of resources (e.g., priority), configuration information of channels in the physical layer, a valid time of the configuration information of the vehicle communication resource pool, a valid service area (e.g., cell identifier, tracking area identifier, zone identifier, and the like) of the configuration information of the vehicle communication resource pool, and allocation manner (e.g., mode1 manner or mode2 manner) of the vehicle communication resource pool.

The OBU may receive the configuration information of the vehicle communication resource pool from the base station and identify resources used for the vehicle communications based on the vehicle communication resource pool. Therefore, the OBU may perform the vehicle communications using resources belonging to the vehicle communication resource pool.

Meanwhile, a modulation and coding scheme (MCS) may be configured by the base station (or, RSU) or OBU (or, UE) in the vehicle communications. The base station may configure the MCS using at least one of the road-related parameter, the vehicle-related parameter, the service-related parameter, the message-related parameter, and the operating time-related parameter. The base station may configure a specific MCS index (e.g., specific MCS level) or an available MAC range. The MCS index (or, MCS range) may be configured per the vehicle (or, OBU, UE) or the zone. For example, in the case of that the MCS index (or, MCS range) is configured per the zone, the OBUs belonging to the zone may use same MCS index (or, MCS range).

The base station may transmit the configured MCS information (e.g., MCS index, MCS range) to the OBU through the system information or the dedicated control message. The OBU may receive the MCS information from the base station. In the case of that the MCS index is received, the OBU may perform the vehicle communications using MCS indicated by the MCS index. In the case of that the MCS range is received, the OBU may select MCS in the MCS range and perform the vehicle communications using the selected MCS.

Meanwhile, a fixed MCS may be used in the base station and the OBU. For example, the fixed MCS may be used according to characteristics (e.g., priority, size, type, and the like) of data included in a message. Alternatively, the fixed MCS for respective zones (or, roads) may be used. In the case of that the fixed MCS is used, control information (e.g., sidelink control (SC) information in the D2D communications based on LTE/LTE-A) including scheduling information for resources used for transmission of data to which the fixed MCS is applied may not be transmitted. For example, the periodic message which is transmitted in the broadcast manner or a message including data whose size belongs to preconfigured range may be transmitted using the fixed MCS without additional scheduling information. In particular, when resources for the vehicle communications are allocated in the SPS manner, the fixed MCS may be effectively used. In addition, a message to which the fixed MCS is applied may be transmitted through resources except for resources in which a message to which MCS configured by the base station or the OBU is applied is transmitted.

Meanwhile, the OBU may configure the MCS using at least one of the road-related parameter, the vehicle-related parameter, the service-related parameter, the message-related parameter, and the operating time-related parameter. Here, a predefined threshold used for comparing each parameter (e.g., road-related parameter, vehicle-related parameter, service-related parameter, message-related parameter, operating time-related parameter, and so on) may be transmitted to the OBU through signaling by the base station or may be pre-stored in the OBU. Criterions (e.g., mapping relation between each parameter and the MCS) for determining MCS (e.g., high efficiency MCS, low efficiency MCS) may be transmitted to the OBU through signaling by the base station or may be per-stored in the OBU.

For example, in the case of that a speed of the vehicle is equal to or more than the predefined threshold (e.g., the speed of the vehicle is a high speed), the OBU may use the high efficiency MCS (e.g., high order modulation manner (e.g., 16 quadrature amplitude modulation (QAM), 64 QAM, and so on) and high coding rate (e.g., ½, ⅔, ⅘, and so on)). In the case of that a speed of the vehicle is less than the predefined threshold (e.g., the speed of the vehicle is a low speed), the OBU may use the low efficiency MCS (e.g., low order modulation manner (e.g., binary phase shift keying (BPSK), quadrature phase shift keying (QPSK), and so on) and low coding rate (e.g., 1/12, ⅙, ⅓, and so on)). The predefined threshold used for determining the speed of the vehicle (or, OBU, UE) may be transmitted to the OBU through signaling by the base station or may be pre-stored in the OBU. The criterions (e.g., mapping relation between the speed of the vehicle and the MCS) for determining MCS (e.g., high efficiency MCS, low efficiency MCS) may be transmitted to the OBU through signaling by the base station or may be per-stored in the OBU.

In addition, in the case of that density of the vehicle (or, OBU, UE) (or, a size of data) is equal to or more than the predefined threshold, the OBU may use the high efficiency MCS (e.g., high order modulation manner (e.g., 16 QAM, 64 QAM, and so on) and high coding rate (e.g., ½, ⅔, ⅘, and so on)). In the case of that density of the vehicle (or, OBU, UE) (or, a size of data) is less than the predefined threshold, the OBU may use the low efficiency MCS (e.g., low order modulation manner (e.g., BPSK, QPSK, and so on) and low coding rate (e.g., 1/12, ⅙, ⅓, and so on)). The predefined threshold used for determining the density of the vehicle (or, a size of data) may be transmitted to the OBU through signaling by the base station or may be pre-stored in the OBU. The criterions (e.g., mapping relation between the density of the vehicle (or, a size of data) and the MCS) for determining MCS (e.g., high efficiency MCS, low efficiency MCS) may be transmitted to the OBU through signaling by the base station or may be per-stored in the OBU.

In addition, in the case of that coverage of service (or, range of service) is equal to or more than the predefined threshold (e.g., 50 meter (m) or 1 kilometer (km)), the OBU may use the low efficiency MCS (e.g., low order modulation manner (e.g., BPSK, QPSK, and so on) and low coding rate (e.g., 1/12, ⅙, ⅓, and so on)). In the case of that coverage of service (or, range of service) is less than the predefined threshold (e.g., 200 m or 300 m), the OBU may use the high efficiency MCS (e.g., high order modulation manner (e.g., 16 QAM, 64 QAM, and so on) and high coding rate (e.g., ½, ⅔, ⅘, and so on)). The predefined threshold used for determining the coverage of service (or, range of service) may be transmitted to the OBU through signaling by the base station or may be pre-stored in the OBU. The criterions (e.g., mapping relation between the coverage of service (or, range of service) and the MCS) for determining MCS (e.g., high efficiency MCS, low efficiency MCS) may be transmitted to the OBU through signaling by the base station or may be per-stored in the OBU.

Next, methods for supporting self-driving in the vehicle communication network (e.g., vehicle communication network shown in FIG. 10) will be described. The RSU supporting self-driving may be a RSU installed in a traffic signal lamp of an intersection (or, crosswalk), a RSU interoperated with the traffic signal lamp of the intersection (or, crosswalk), or a RSU installed in a structure (or, building) which is adjacent to the road, and so on. In addition, the RSU may support the base station-functions or the relay-functions. In this case, the RSU may configure the direct communication resource pool and support connection functions between an infrastructure network and the OBU.

The RSU may control the traffic signal (e.g., operation timing of the traffic signal, stop of operation of a specific traffic signal) by exchanging information with a transportation control center (e.g., intelligent transportation system (ITS), and the like) (or, without exchange of the information). The RSU may transmit or receive the control information/data to or from the OBU using resources (e.g., radio interface (e.g., Uu interface) between the base station and the UE) for the direct communications (e.g., D2D communications, vehicle communications).

The RSU may obtain the vehicle-related parameter from the OBU or estimate the vehicle-related parameter using additional sensors, image devices, and so on. In addition, the RSU may obtain the vehicle-related parameter from other RSU which is located in or interoperated with the traffic signal lamp of an adjacent intersection (or, crosswalk). The RSU may control the traffic signal in consideration of the vehicle-related parameter.

The RSU may transmit a control message instructing deceleration, stop of acceleration, or stop to the OBU before a stop signal of the traffic signal lamp turns on (e.g., prior to predefined reference time). In addition, the RSU may transmit a control message indicating an operating time of the stop signal of the traffic signal lamp to the OBU. Here, the operating time may be remaining duration until the stop signal turns on or an exact time at which the stop signal operates. In the case of that the control message related to the stop signal is received, the OBU may control the vehicle to decelerate speed or to be stopped based on the speed of the vehicle, a road situation (e.g., road-related parameter), a distance from a preceding vehicle, and so on. In particular, the vehicle supporting self-driving may perform efficiently self-driving functions based on information obtained by the direct communications with the RSU instead of information collected by sensors used for self-driving. For example, the RSU may enhance efficiency of the self-driving functions by transmitting a control signal informing operations (or, end of operations) of the traffic signal lamp indicating start, stop, light-turn, right-turn, and so on and operations (or, end of operations) of a traffic signal lamp installed in a crosswalk for a pedestrian to the OBU.

The RSU may obtain user information (i.e., user information of the UE) from the UE located on the road (e.g., sidewalk) using resources (e.g., radio interface (e.g., Uu interface) between the base station and the UE) for the direct communications (e.g., D2D communications, vehicle communications) and transmit the obtained information to the OBU located on the road. The user information may be safety-related information (e.g., information for preventing vehicle accidents). For example, the user information may include a location, a speed, a type (e.g., disabled person, child, and so on), a walking assist device, the means of transportation (e.g., bicycle) of the user (e.g., pedestrian), and so on.

Alternatively, the RSU may obtain the user information using other methods instead of the direct communications and transmit the obtained user information to the OBU located on the road. For example, the RSU may obtain the user information based on image information obtained from the image devices (e.g., CCTV, camera, and the like). Alternatively, the RSU may obtain the user information through gaze communications (or, look and link communications). Here, the gaze communications (or, look and link communications) may be point-to-point direct communications in which information is obtained from a counterpart communication node by transmitting radio wave (or, beam) having strong straightness to the counterpart communication node. According to the gaze communications (or, look and link communications), communications with the counterpart communication node may be performed though identifier information (e.g., phone number, source ID, destination ID, and so on) of the counterpart communication node is unknown.

The RSU may obtain vehicle information (i.e., information of vehicle in which the OBU is installed) from the OBU located on the road and transmit the obtained vehicle information to the UE located on the road (e.g., sidewalk). According to the foregoing operations, the vehicle accidents may be prevented. Here, the vehicle information may be the speed, the movement path, and the type of the vehicle.

Meanwhile, in the case of that it is identified that the pedestrian exists by the additional sensors or the image devices (e.g., CCTV, camera, and the like), the RSU may transmit the identified pedestrian-related information (e.g., user information) to the OBU using resources for the direct communications in the broadcast manner. Alternatively, in the case of that it is identified that the pedestrian exists, the RSU may request a transmission of the user information to the UE of the pedestrian and obtain the user information in response to the request from the UE. Regardless of the request of the transmission of the user information, the UE may transmit the user information to the RSU when it is identified that the RSU exists. The RSU may generate an alarm message for preventing the vehicle accidents in consideration of the obtained user information and transmit the generated alarm message to the OBU located on the road.

Meanwhile, the foregoing user information (or, vehicle information) may be transmitted to a RSU which performs monitoring operations on the road-related parameter and a RSU which supports the relay-functions out of coverage of the communication network.

Next, communication methods performed by the communication node in the vehicle communication network will be described.

Figure 11:
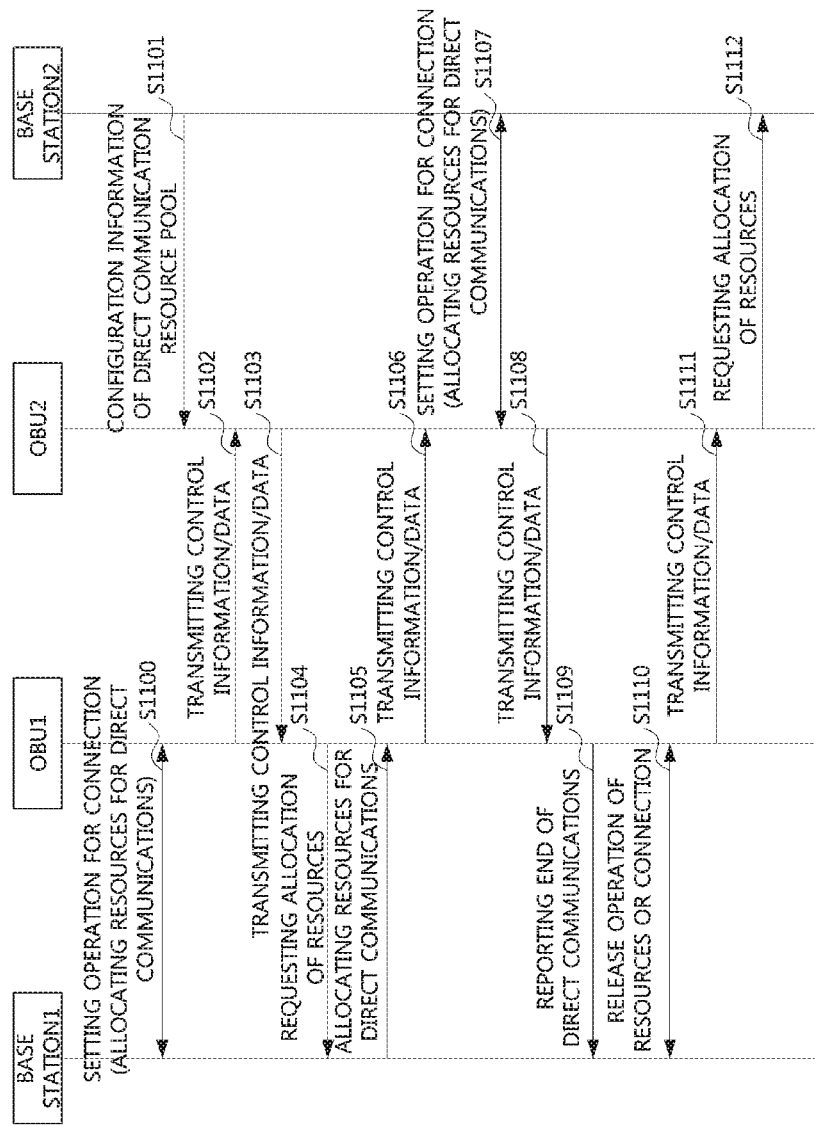
FIG. 11 is a sequence chart showing embodiments of a communication method performed by a communication node in a vehicle communication network.

FIG. 11 is a sequence chart showing embodiments of a communication method performed by a communication node in a vehicle communication network.

As shown in FIG. 11, each of a base station1 and a base station2 may be the base station 821, 822 or the RSU 831, 832 shown in FIG. 8. Each of an OBU1 and an OBU2 may be the UE 841, 842 or the OBU 851, 852 shown in FIG. 8. For example, the transmission and reception operations of the control information/data between the base station and the OBU may be performed through Uu interface. The transmission and reception operations of the control information/data between OBUs may be performed through PC5 interface. Each of the base station1, the base station2, the OBU1, and the OBU2 may be identical or similar to a structure of the communication node 200 shown in FIG. 2. An operator of the base station1 may be identical to or different from an operator of the base station2. An operator to which the OBU1 subscribes may be identical to or different from an operator to which the OBU2 subscribes.

Meanwhile, the base stations may pre-negotiate the direct communication resource pool so that the direct communications are performed regardless of the state of OBUs (e.g., RRC connected state, RRC idle state). The configuration information of the direct communication resource pool may include the system bandwidth, the center frequency, the frequency resource information, the time resource information, the resource period (or, resource interval), and so on. The direct communication resource pool may be divided to a transmission resource pool, a reception resource pool, and so on. In addition, the direct communication resource pool may be divided to a resource pool for discovery operations, a resource pool for data communications, and so on.

An operation for connection (e.g., bearer) configuration (or, establishment) between the base station1 and the OBU1 may be performed (S1100). In the case of that the operation of the connection configuration (or, establishment) is completed, the OBU1 may operate in the RRC connected state. In the step S1100, the base station1 may allocate resources of the direct communication for the OBU1 based on the mode1 manner. For example, the base station1 may select the resources of the direct communication in the direct communication resource pool (e.g., direct communication resource pool which is pre-negotiated between the base stations) and transmit the selected resources to the OBU1. The OBU1 may obtain resource information from the base station1 and identify the resources of the direct communications based on the obtained resource information.

The OBU2 may operate in the RRC idle state without connection configuration (or, establishment) with the base station2. For example, the OBU2 may operate in a camping state in which the OBU2 is camped in the base station2. The resources of the direct communications for the OBU2 may be configured based on the mode2 manner. For example, the base station2 may transmit the system information including the configuration information of the direct communication resource pool (e.g., direct communication resource pool which is pre-negotiated between the base stations) (S1101). The OBU2 may acquire the system information from the base station2 and identify the configuration information of the direct communication resource pool from the system information. Here, it is described that the step S1101 is performed after the step S1100, however, performing order of the step S1101 may not be limited thereto. For example, the step S1101 and the step S1100 may be performed simultaneously, or the step S1101 may be performed prior to the step S1100.

After that, the OBU1 may transmit the control information (or, data) to the OBU2 using the direct communications (S1102). The transmission and reception operations of the control information (or, data) may be performed though the state of the OBU1 (e.g., RRC connected state) is different from the state of the OBU2 (e.g., RRC idle state). For example, the OBU1 may transmit scheduling information for the control information (or, data) using an additional control channel (e.g., resources used for transmitting the scheduling information) of the physical layer for the direct communications. The scheduling information may include resource allocation information (e.g., frequency resource information, time resource information), MCS information, and so on. Here, the MCS information may be configured based on at least one of the road-related parameter, the vehicle-related parameter, the service-related parameter, the message-related parameter, and the operating time-related parameter.

After transmitting the scheduling information, the OBU1 may transmit the control information (or, data) to which MCS indicated by the scheduling information is applied through resources indicated by the scheduling information. Meanwhile, the OBU2 may obtain the scheduling information from the OBU1 by monitoring the resources belonging to the direct communication resource pool. The OBU2 may obtain the control information (or, data) through the resources indicated by the scheduling information and perform demodulation/decoding operations on the control information (or, data) based on the MCS indicated by the scheduling information.

The OBU2 may randomly select resources in the direct communication resource pool which is obtained in the step S1101 and transmit the control information (or, data) to the OBU1 using the selected resources (S1103). The OBU1 may identify the configuration information of the direct communication resource pool (e.g., direct communication resource pool which is pre-negotiated between the base stations) based on the system information or the control message each of them is transmitted from the base station1. The OBU1 may receive the control information (or, data) from the OBU2 by performing monitoring operations on the resources belonging to the identified direct communication resource pool. In addition, the OBU1 may obtain the scheduling information from an adjacent communication node and receive the control information (or, data) from the OBU2 through the resources indicated by the scheduling information.

Meanwhile, in the case of that resources used for transmitting the control information (or, data) do not exist (e.g., in the case of that the resources which are allocated in the step S1100 are unavailable), the OBU1 may request resource allocation to the base station1 (e.g., OBU1 may transmit a control message requesting the resource allocation to the base station1) (S1104). For example, the OBU1 may request the resource allocation to the base station1 based on a random access procedure, a requesting procedure for scheduling a physical uplink control channel (PUCCH), or the BSR procedure. Additional resources (e.g., resources which are allocated based on the random access procedure, resources which are allocated based on the BSR procedure, and so on) for the OBU1 may be configured so that interferences which are occurred to other communication node serviced by the base station1 are minimized. In particular, an additional PUCCH for the direct communications may be configured.

In the case of that the request of the resource allocation is received from the OBU1, the base station1 may allocate the resources of the direct communications (S1105). For example, the base station1 may select the resources of the direct communications in the direct communication resource pool (e.g., direct communication resource pool which is pre-negotiated between the base stations) and transmit the selected resource information to the OBU1. The resources of the direct communications which are allocated in the step S1105 may be different from the resources of the direct communications which are allocated in the step S1100. In the case of that the resources of the direct communications are allocated, the OBU1 may transmit the control information (or, data) to other communication node (e.g., OBU2) using the allocated resources (S1106). In the case of that the requesting procedure (i.e., steps S1104 and S1105) for the resource allocation is not performed, the OBU1 may randomly select resources in the direct communication resource pool which is obtained from the system information or the control message and transmit the control information (or, data) to other communication node (e.g., OBU2) using the selected resources. The OBU2 may receive the control information (or, data) from the OBU1 by monitoring resources belonging to the direct communication resource pool obtained in the step S1101.

Meanwhile, the OBU2 which operates in the RRC idle state may perform an operation for connection establishment (or, configuration) with the base station2, if necessary (S1107). In the case of that the operation for the connection establishment (or, configuration) is completed, the OBU2 may operate in the RRC connected state. In the step S1107, the base station2 may allocate resources of the direct communication for the OBU2 based on the mode1 manner. For example, the base station2 may select the resources of the direct communication in the direct communication resource pool (e.g., direct communication resource pool which is pre-negotiated between the base stations) and transmit the selected resource information to the OBU2. The OBU2 may obtain the resource information from the base station2 and identify the resources of the direct communications based on the obtained resource information. After that, the OBU2 may transmit the control information (or, data) to the OBU1 using the resources allocated by the base station2 (S1108). The OBU1 may receive the control information (or, data) from the OBU2 by monitoring resources belonging to the direct communication resource pool which is obtained through the system information or the control message.

Meanwhile, in the case of that a direct communication service based on the mode1 manner is ended, the OBU1 may transmit a message instructing an end of the direct communication service based on the mode1 manner to the base station1 (S1109). In the case of that the message instructing the end of the direct communication service based on the mode1 manner is received, the base station1 may perform a resource release operation or a connection release operation of the direct communications (S1110). When the resource release operation is performed, the base station1 may release the resources which are configured for the direct communications of the OBU1. In this case, the OBU1 may not perform the direct communication functions and operate in the RRC connection state. When the connection release operation is performed, the base station1 may release the resources which are configured for the direct communications of the OBU1 and the connection with the OBU1. In this case, the base station1 may transmit a reconfiguration message informing connection release to the OBU1. The reconfiguration message may include the configuration information of the direct communication resource pool (e.g., direct communication resource pool which is pre-negotiated between the base stations). Here, the OBU1 may operate in the RRC idle state and identify the configuration information of the direct communication resource pool by receiving the reconfiguration message.

After that, in the case of that the control information (or, data) which will be transmitted based on the direct communication manner is generated, the OBU1 may randomly select resources in the direct communication resource pool which is obtained through the system information or the step S1110 and transmit the control information (or, data) to the OBU2 using the selected resources (S1111). The OBU2 may receive the control information (or, data) from the OBU1 by monitoring resources belonging to the direct communication resource pool which is obtained through the step S1101.

Meanwhile, in the case of that resources used for transmitting the control information (or, data) do not exist (e.g., in the case of that the resources which are allocated in the step S1107 are unavailable), the OBU2 may request resource allocation to the base station1 (e.g., OBU2 may transmit a control message requesting the resource allocation to the base station1) (S1112). Here, the step S1112 may be identical or similar to the foregoing step S1104. The OBU2 may obtain the resources of the direct communications in response to the request of the resource allocation from the base station2 and transmit the control information (or, data) using the obtained resources.

The foregoing steps S1100 to S1112 may not be performed sequentially. Some steps (e.g., steps for the operation for the connection establishment (or, configuration) (i.e., S1100 and S1107), steps for the resource allocation request (i.e., S1104, S1105, and S1112), steps for the transmission of the control information/data (i.e., S1102, S1103, S1106, S1108, and S1111), steps for the end of the direct communications (i.e., S1109 and S1110), and so on) may be performed optionally.

Next, in the vehicle communication network, communication methods based on the gaze communications (or, image information) will be described.

Figure 12:
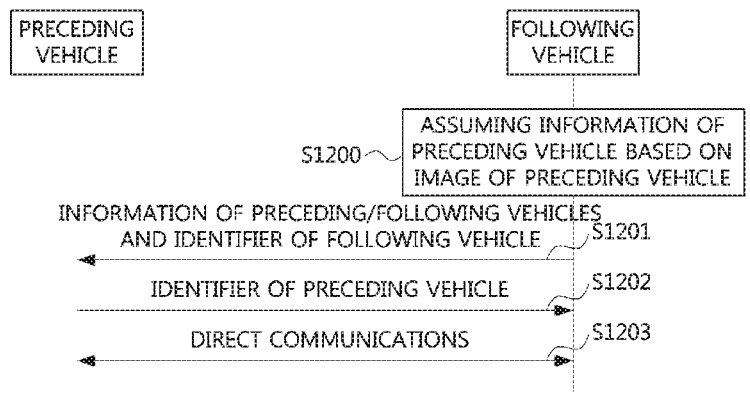
FIG. 12 is a sequence chart showing embodiments of a communication method based on gaze communications (or, look and link communications) in a vehicle communication network.

FIG. 12 is a sequence chart showing embodiments of a communication method based on gaze communications (or, look and link communications) in a vehicle communication network.

As shown in FIG. 12, the vehicle communication network may include a preceding vehicle, a following vehicle, and so on. Each of the preceding vehicle and the following vehicle may include the OBU 851, 852 or the UE 841, 842 shown in FIG. 8. Each of the preceding vehicle and the following vehicle may include the image devices. The following vehicle may obtain images of the preceding vehicle using the image devices and estimate information of the preceding vehicle (e.g., a type and number of the preceding vehicle, and so on) by analyzing the obtained images (S1200).

The following vehicle may transmit a message including the information of the preceding vehicle, information of the following vehicle (e.g., a type and number of the following vehicle, and so on), an identifier of the following vehicle, and so on to the preceding vehicle (S1201). In this case, the following vehicle may transmit the message including the information of the preceding vehicle, the information of the following vehicle, the identifier of the following vehicle, and so on to the preceding vehicle using the direct communications or the gaze communications (or, look and link communications). In the case of that the direct communications are used, the message may be transmitted in the broadcast manner or the multicast manner. In the case of that the gaze communications (or, look and link communications) are used, the message may be transmitted through the radio wave (or, beam) having strong straightness.

The preceding vehicle may receive the message from the following vehicle and identify the information of the preceding vehicle, the information of the following vehicle, the identifier of the following vehicle, and so on included in the message. In the case of that a reliability of the message (or, information included in the message) received from the following vehicle is satisfied with a predefined criterion (or, if necessary), the preceding vehicle may transmit a message including an identifier of the preceding vehicle to the following vehicle (S1202). In the case of that the steps S1201 and S1202 are performed, an operation related to join/out of a group, a report operation of a state of each vehicle (e.g., abnormal state, and so on), and so on may be performed.

In the foregoing the steps S1200 to S1202, the preceding vehicle may perform a role of the following vehicle, and the following vehicle may perform a role of the preceding vehicle. For example, the steps S1200 and S1201 may be performed by the preceding vehicle, and the step 1202 may be performed by the following vehicle.

After that, the direct communications (e.g., point-to-point direct communications) between the preceding vehicle and the following vehicle may be performed (S1203). In the case of that the direct communications may be performed, the operation related to join/out of the group, the report operation of the state of each vehicle (e.g., abnormal state, and so on), and so on may be performed.

Meanwhile, for supporting the vehicle communications, the base station (or, RSU) may perform downlink transmission in the broadcast manner or the multicast manner. For example, the base station may transmit information obtained from the OBU (or, UE) or the communication node belonging to the network (e.g., communication node belonging to the higher layer) through broadcast resources (or, multicast resources) of the downlink. In the case of that the broadcast manner is used, the base station may transmit the information obtained from the OBU or the network through resources which are configured for transmission of a multimedia broadcast/multicast service (MBMS) single-frequency network (MBSFN) (hereafter, "MBSFN resources").

The base station may transmit the control information/data related to the vehicle communications using the MBSFN resources in the broadcast manner according to a MBMS procedure. In this case, the base station may configure an additional MBSFN subframe supporting the vehicle communications and transmit the control information/data related to the vehicle communications using the additional MBSFN subframe. In addition, the base station may transmit information obtained from the OBU to a communication node (e.g., sever supporting the vehicle communications, MBMS coordination entity (MCE), and so on) belonging to the network. According to control of the communication node (e.g., sever supporting the vehicle communications, MCE, and so on) belonging to the network, the base station may transmit the control information/data related to the vehicle communications using the additional MBSFN subframe in the broadcast manner.

Meanwhile, in the case of that the multicast manner is used, the base station may transmit the control information of the physical layer using an additional group scheduling identifier configured for the vehicle communications (e.g., V2X-radio network temporary identifier (V2X-RNTI)), and then transmit information using a physical downlink shared channel (PDSCH) indicated (e.g., addressed) by the control information of the physical layer. In particular, the base station may perform simultaneously a transmission operation in which information obtained from the OBU belonging to a specific group is transmitted to a communication node (e.g., sever supporting the vehicle communications, MCE, and so on) belonging to the network and a transmission operation in which information obtained from the OBU belonging to the specific group is transmitted to the specific group using a specific group scheduling identifier in the multicast manner.

Here, in the case of that the control information/data related to the vehicle communications is received from the OBU through uplink resources or resources belonging to the vehicle communication resource pool, the base station may identify a group to which the OBU transmitting the control information/data related to the vehicle communications belongs. In this case, the base station may determine whether to transmit the control information/data related to the vehicle communications to OBUs belonging to the identified group regardless of the control information/data related to the vehicle communications obtained from the OBU is transmitted to the communication node belonging to the network. For example, the base station may transmit the control information/data related to the vehicle communications to OBUs belonging to a corresponding group using a group identifier (e.g., destination identifier/address for the vehicle communications) or the group scheduling identifier (e.g., V2X-RNTI). In this case, the control information/data related to the vehicle communications may be transmitted through downlink resources in the multicast manner.

In the foregoing transmission procedure of the control information/data related to the vehicle communications, the OBU may transmit the control information/data related to the vehicle communications using PC5 interface or Uu interface, and the base station may transmit the control information/data related to the vehicle communications using Uu interface.

Meanwhile, in the LTE/LTE-A system, a message transmission may be performed in unit of a physical resource block (PRB) for supporting the D2D communications, the vehicle communications, the MTC, the M2M based communications, the IoT based communications, and so on. Here, the message may include the control information and the data for the direct communications, and so on. The message transmission based on the PRB may be performed as follows.

Figure 13:
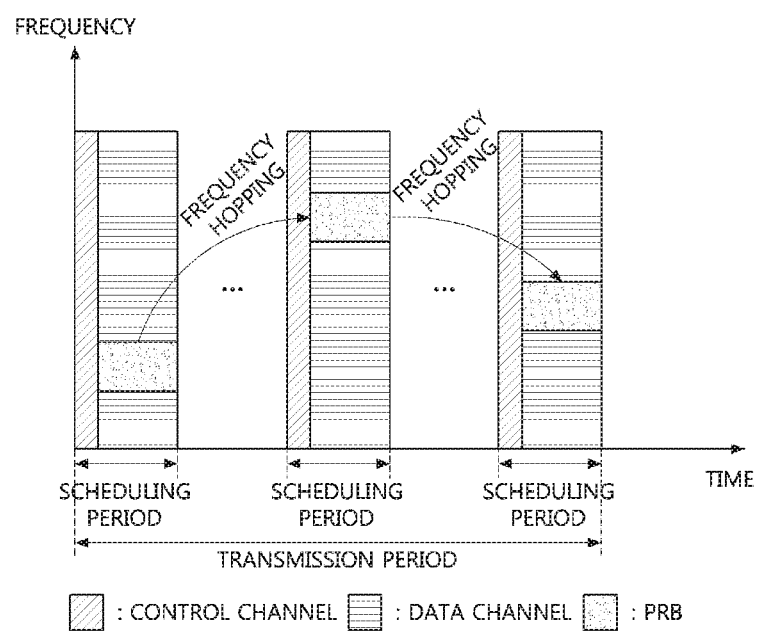
FIG. 13 is a timing diagram showing embodiments of a method for transmitting a message through PRB.

FIG. 13 is a timing diagram showing embodiments of a method for transmitting a message through PRB.

As shown in FIG. 13, a control channel may be a physical downlink control channel (PDCCH), a physical sidelink control channel (PSCCH), and so on, and a data channel may be the PDSCH, a physical sidelink shared channel (PSSCH), and so on. The PRB may be configured according to a scheduling period. In addition, the PRB may be configured based on a frequency hopping manner. The base station (e.g., block, which is included in the base station, supporting scheduling functions) may generate scheduling information including PRB allocation information, MCS information, and so on. The base station may transmit the scheduling information through the control channel. The OBU may receive the scheduling information through the control channel from the base station and transmit data to which MCS indicated by the scheduling information is applied through the PRB indicated by the scheduling information.

Alternatively, the OBU may randomly select the PRB in the direct communication resource pool which is pre-obtained from the base station and transmit data through the selected PRB. In this case, the base station may not transmit the scheduling information and may control the OBU to select randomly the PRB in the direct communication resource pool. In addition, the base station may control the predefined OBU (or, UE, group) to select the PRB based on a scheduling pattern.

Next, a repetition transmission method of data in the direct communications will be described. Here, the repetition transmission may include retransmission, hybrid automatic repeat request (HARQ) based transmission, and so on. The data channel of the physical layer for the direct communications may be the PUSCH and PSSCH of the LTE/LTE-A system, an additional data channel configured for the direct communications, and so on. The control channel of the physical layer for the direct communications may be the PDCCH, an enhanced PDCCH (EPDCCH), PUCCH, and PSCCH of the LTE/LTE-A system, an additional control channel configured for the direct communications, and so on.

For extending service coverage, enhancing transmission reliability, and so on in the direct communications, a message may be repeatedly transmitted through PRB (e.g., PRB allocated by the base station, PRB selected by the OBU) in a transmission period (or, transmission duration, transmission window), continuously or discretely. Here, the message may include the control information and the data for the direct communications, and so on. The transmission period may be a time interval which is configured in a time axis and may be additionally configured for the direct communications. The transmission period may be signaled to the OBU through a control message. For example, the transmission period may be a transmission period shown in FIG. 13.

The control information for the repetition transmission of data may include the number of repeated transmissions, redundancy version (RV), MCS information, repetition transmission time, resource allocation information (e.g., system bandwidth, frequency resource information (e.g., subcarrier index, and the like), time resource information (e.g., subframe index, slot index, symbol index, and the like), and so on. The control information for the repetition transmission may be transmitted in an explicit signaling manner or an implicit signaling manner. Alternatively, the control information for the repetition transmission may be configured by a communication node performing the repetition transmission of data. Here, the communication node may be the base station, the UE, the RSU, the OBU, and so on.

A Repetition Transmission Method of Data Based on the Explicit Signaling Manner

A transmitting communication node may transmit the control information for the repetition transmission to a receiving communication node. Alternatively, the control information for the repetition transmission may be preconfigured in the transmitting communication node and the receiving communication node. Therefore, the transmitting communication node may perform the repetition transmission of data based on the control information for the repetition transmission. The receiving communication node may receive data which is repeatedly transmitted based on the control information for the repetition transmission and perform the demodulation/decoding operations on the received data. In addition, the receiving communication node may transmit a feedback message (e.g., acknowledgement (ACK) message) indicating that the data is successfully received to the transmitting communication node.

A Repetition Transmission Method of Data Based on the Implicit Signaling Manner

The number of repeated transmissions of data may be configured based on capability of the communication node, a location of the communication node, the MCS information, the resource allocation information, attributes of service (e.g., attribute indicating whether to generate the periodic message, attribute indicating whether to transmit divided data, attribute indicating a transmission type of data, and so on), coverage (e.g., range) of service, a size of data, and so on. That is, mapping relation between the number of repeated transmissions and other information may be pre-configured in the network, or may be transmitted to the communication node through an additional control signaling.

For example, the MCS index indicating 1 is mapped to the number of repeated transmissions indicating 2, the MCS index indicating 2 is mapped to the number of repeated transmissions indicating 4, and the MCS index indicating 3 is mapped to the number of repeated transmissions indicating 6. Therefore, the transmitting communication node may select the number of repeated transmissions mapped to the MCS index and transmit repeatedly data according to the number of repeated transmissions. The receiving communication node may identify the number of repeated transmissions mapped to the MCS index and receive data which is repeatedly transmitted according to the number of repeated transmissions.

In addition, in the case of that the transmission manner of data may be divided to a transmission manner based on a path (or, logic channel) of a user plane and a transmission manner based on a path of a control plane, the number of repeated transmissions mapped to the transmission manner based on the path of the user plane may be different from the number of repeated transmissions mapped to the transmission manner based on the path of the control plane. In addition, the number of repeated transmissions may be differently configured according to whether transmission of piggy back is performed.

In addition, mapping relation between a range of data size and the number of repeated transmissions may be preconfigured, and the number of repeated transmissions may be configured according to the range of data size to which current data belongs.

A Repetition Transmission Method of Data Based on Configuration of the Communication Node A minimum number of repeated transmissions and a maximum number of repeated transmissions may be preconfigured in the network, or may be transmitted to the communication node through an additional control signaling. The transmitting communication node may configure the number of repeated transmissions to as multiple of the minimum number of repeated transmissions. Here, the configured number of repeated transmissions may be equal to or less than the maximum number of repeated transmissions. In addition, the number of repeated transmissions may be variably configured according to the capability of the communication node, the location of the communication node, the MCS information, the resource allocation information, the attributes of service, the coverage of service, area of service, a size of data, and so on.

Figure 14:
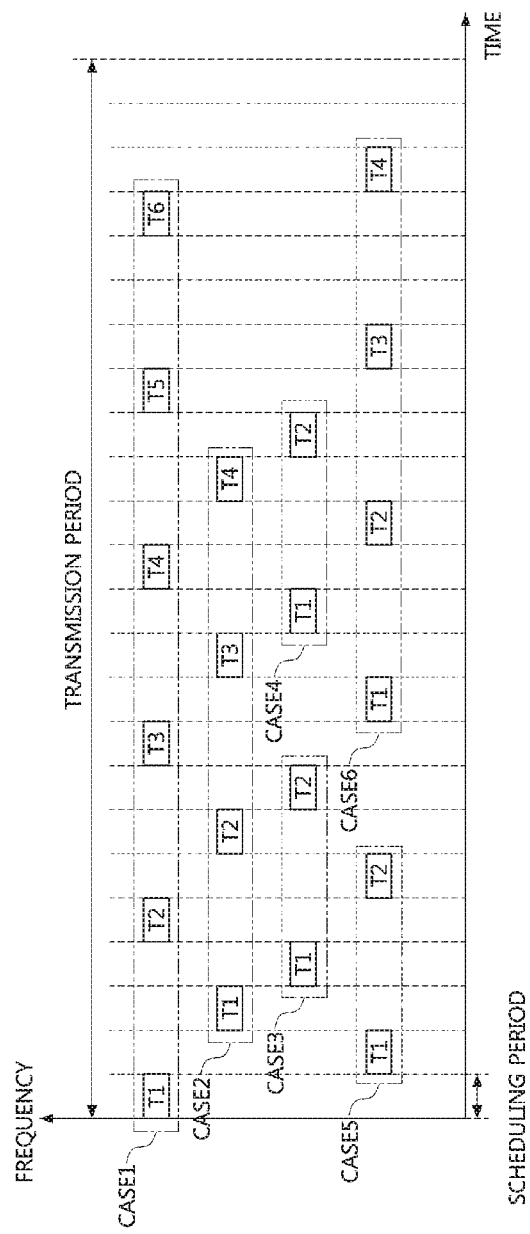
FIG. 14 is a timing diagram showing embodiments of a method for repetition transmission of data.

FIG. 14 is a timing diagram showing embodiments of a method for repetition transmission of data.

As shown in FIG. 14, each of a transmitting communication node and a receiving communication node may be the foregoing base station, RSU, UE, OBU, and so on. T1 may indicate initial data, T2 may indicate second repeated data, T3 may indicate third repeated data, T4 may indicate fourth repeated data, T5 may indicate fifth repeated data, and T6 may indicate sixth repeated data. Scheduling information of T1 (e.g., resource allocation information, MCS information, and so on) may be configured by the communication node, or may be transmitted to the communication node through a differently defined control message. In the case of that the scheduling information of T1 is determined, scheduling information of T2 (or, T3, T4, T5, T6, and so on) after T1 may be configured based on the scheduling information of T1.

The number of repeated transmissions of data may be determined based on the foregoing manner. The mapping relation between the number of repeated transmissions and other information, the transmission period of data, an initial transmission time, a repetition transmission time, the minimum number of repeated transmissions, the maximum number of repeated transmissions, criterions (or, conditions, rules) for changing the number of repeated transmissions, a repetition transmission manner, the scheduling information, and so on may be referred to as a common parameter. The common parameter may be configured in unit of a specific service region (e.g., service area, cell, coverage, and the like), a group of the communication node, or the communication node. The common parameter may be signaled to the communication node through the system information, the dedicated control message, a MAC control protocol data unit (PDU), or a control field of the physical layer.

The transmitting communication node may repeatedly transmit data according to the number of repeated transmissions in the transmission period. The receiving communication node may receive data from the transmitting communication node and perform the demodulation/decoding operations on the received data by performing a soft combining operation based on the minimum number of repeated transmissions in the transmission period. Meanwhile, the receiving communication node may perform the demodulation/decoding operations on data using repetition reception techniques though the receiving communication node does not know the number of repeated transmissions. Here, the soft combining techniques may include chase combining techniques, incremental redundancy (IR) techniques, and so on. In addition, techniques (e.g., transmission techniques of RV of cyclic redundancy check (CRC) or a pattern of different parity bits) for combining repeated data (or, bit, symbol) may be used in order to enhance reception performance.

A Repetition Transmission Method of Data in a Case1 May be as Follows.

In the case1, the number of repeated transmissions may be 6. In the transmission period, the transmitting communication node may repeatedly transmit data (e.g., T1, T2, T3, T4, T5, and T6) in six times. The receiving communication node may receive the data (e.g., T1, T2, T3, T4, T5, and T6) from the transmitting communication node and perform the modulation/decoding operations on the receive data (e.g., T1, T2, T3, T4, T5, and T6) by performing the soft combining operation based on the minimum number of repeated transmissions.

In the case of that the minimum number of repeated transmissions is 2, the receiving communication node may perform the soft combining operation in unit of two data. The receiving communication node may identify a CRC by performing the soft combining operation on each of "T1, T2," "T3, T4," and "T5, T6." In the case of that a CRC result of two data is "check good" (e.g., channel state is satisfied with predefined criterion), a corresponding data may be transmitted to the higher layer.

On the other hand, in the case of that the CRC result of two data is not "check good" (e.g., channel state is not satisfied with predefined criterion), the transmitting communication node may perform the soft combining operation on the result of the soft combining operation on "T1, T2" and the result of the soft combining operation on "T3, T4," and may perform the soft combining operation on the result of the soft combining operation on "T3, T4" and the result of the soft combining operation on "T5, T6." In the case of that a CRC result of four data is "check good," a corresponding data may be transmitted to the higher layer.

On the other hand, in the case of that the CRC result of four data is not "check good," the transmitting communication node may perform the soft combining operation on the result of the soft combining operation on "T1, T2," the result of the soft combining operation on "T3, T4," and the result of the soft combining operation on "T5, T6." In the case of that a CRC result of six data is "check good," a corresponding data may be transmitted to the higher layer. On the other hand, in the case of that the CRC result of six data is not "check good," a message indicating reception failure may be transmitted to the higher layer.

A Repetition Transmission Method of Data in a Case2 and a Case6 May be as Follows.

In each of the case2 and the case6, the number of repeated transmissions may be 4. In the transmission period, the transmitting communication node may repeatedly transmit data (e.g., T1, T2, T3, and T4) in four times. The receiving communication node may receive the data (e.g., T1, T2, T3, and T4) from the transmitting communication node and perform the modulation/decoding operations on the receive data (e.g., T1, T2, T3, and T4) by performing the soft combining operation based on the minimum number of repeated transmissions.

In the case of that the minimum number of repeated transmissions is 2, the receiving communication node may perform the soft combining operation in unit of two data. The receiving communication node may identify a CRC by performing the soft combining operation on each of "T1, T2," and "T3, T4." In the case of that a CRC result of two data is "check good" (e.g., channel state is satisfied with predefined criterion), a corresponding data may be transmitted to the higher layer.

On the other hand, in the case of that the CRC result of two data is not "check good," the transmitting communication node may perform the soft combining operation on the result of the soft combining operation on "T1, T2" and the result of the soft combining operation on "T3, T4." In the case of that a CRC result of four data is "check good," a corresponding data may be transmitted to the higher layer. On the other hand, in the case of that the CRC result of four data is not "check good," a message indicating reception failure may be transmitted to the higher layer.

A Repetition Transmission Method of Data in a Case3, a Case4, and a Case5 May be as Follows.

In each of the case3, the case4, and the case5, the number of repeated transmissions may be 2. In the transmission period, the transmitting communication node may repeatedly transmit data (e.g., T1 and T2) in two times. The receiving communication node may receive the data (e.g., T1 and T2) from the transmitting communication node and perform the modulation/decoding operations on the receive data (e.g., T1 and T2) by performing the soft combining operation based on the minimum number of repeated transmissions. In the case of that the minimum number of repeated transmissions is 2, the receiving communication node may perform the soft combining operation in unit of two data. The receiving communication node may identify a CRC by performing the soft combining operation on each of "T1, T2." In the case of that a CRC result of two data is "check good," a corresponding data may be transmitted to the higher layer. On the other hand, in the case of that the CRC result of two data is not "check good," a message indicating reception failure may be transmitted to the higher layer.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a user equipment (UE) in a communication system, the operation method comprising:
    receiving, from a base station, a signaling message indicating a speed threshold, a first modulation and coding scheme (MCS) range which is used when a speed of the UE is above the speed threshold, and a second MCS range which is used when the speed of the UE is below the speed threshold;
    determining a MCS value within the first MCS range or the second MCS range which is determined based on the speed of the UE; and
    performing a transmission process using the determined MCS value.

2. The operation method of claim 1, wherein each of the first MCS range and the second MCS range indicates minimum and maximum MCS values.

3. The operation method of claim 1, wherein the transmission process is performed without scheduling of the base station.

4. The operation method of claim 1, wherein the signaling message further indicates a resource pool in which the transmission process is performed using the first MCS range or the second MCS range.

5. The operation method of claim 4, wherein the performing the transmission process comprises:
    determining resources within the resource pool; and
    performing the transmission process using the determined MCS value in the determined resources.

6. The operation method of claim 4, wherein the resource pool is used for the transmission process in a zone including one or more cells.

7. An operation method of a base station in a communication system, the operation method comprising:
    determining a speed threshold;
    determining a first modulation and coding scheme (MCS) range which is used when a speed of a user equipment (UE) is above the speed threshold and a second MCS range which is used when the speed of the UE is below the speed threshold;
    generating a signaling message indicating the speed threshold, the first MCS range, and the second MCS range; and
    transmitting the signaling message to the UE.

8. The operation method of claim 7, wherein each of the first MCS range and the second MCS range indicates minimum and maximum MCS values.

9. The operation method of claim 7, wherein the signaling message further indicates a resource pool in which a transmission process is performed using the first MCS range or the second MCS range.

10. The operation method of claim 9, wherein the resource pool is used for the transmission process in a zone including one or more cells.

11. The operation method of claim 9, wherein the resource pool is configured based on the speed of the UE.

\* \* \* \* \*